(12) United States Patent
Biry

(10) Patent No.: US 7,025,814 B2
(45) Date of Patent: Apr. 11, 2006

(54) INK-JET INK AND RECORDING MATERIAL

(75) Inventor: Stéphane Biry, Village-Neuf (FR)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 129 days.

(21) Appl. No.: 10/466,034

(22) PCT Filed: Jan. 8, 2002

(86) PCT No.: PCT/EP02/00091

§ 371 (c)(1),
(2), (4) Date: Jul. 11, 2003

(87) PCT Pub. No.: WO02/055618

PCT Pub. Date: Jul. 18, 2002

(65) Prior Publication Data
US 2004/0074417 A1 Apr. 22, 2004

(30) Foreign Application Priority Data
Jan. 16, 2001 (EP) .................................. 01810038

(51) Int. Cl.
C09D 11/02 (2006.01)

(52) U.S. Cl. ............................... 106/31.43; 106/31.46; 106/31.47; 106/31.49; 106/31.75; 106/31.76; 106/31.77; 106/31.78

(58) Field of Classification Search ............. 106/31.43, 106/31.46, 31.47, 31.49, 31.75, 31.76, 31.77, 106/31.78; 428/32.1
See application file for complete search history.

(56) References Cited

U.S. PATENT DOCUMENTS

| | | | | |
|---|---|---|---|---|
| 5,607,987 A * | 3/1997 | Winter et al. | ................ | 524/91 |
| 6,102,997 A | 8/2000 | Helling et al. | ............ | 106/31.43 |
| 6,254,724 B1 * | 7/2001 | Seltzer et al. | ................ | 162/70 |
| 6,676,735 B1 * | 1/2004 | Oki et al. | ................ | 106/31.46 |
| 6,811,597 B1 * | 11/2004 | Oki et al. | ................ | 106/31.46 |
| 2002/0050226 A1 * | 5/2002 | Oki et al. | ................ | 106/31.46 |
| 2003/0070582 A1 * | 4/2003 | Kitamura et al. | ........ | 106/31.46 |
| 2004/0011249 A1 * | 1/2004 | Oki et al. | ................ | 106/31.46 |
| 2004/0126510 A1 * | 7/2004 | Wood et al. | ................ | 428/32.1 |
| 2004/0170779 A1 * | 9/2004 | Wood et al. | ................ | 428/32.1 |
| 2004/0210056 A1 * | 10/2004 | Wood et al. | ................ | 546/216 |

FOREIGN PATENT DOCUMENTS

| JP | 11170686 | 6/1999 |
|---|---|---|
| JP | 2000-044851 | * 2/2000 |

OTHER PUBLICATIONS

English abstract of JP2000-044851; Feb. 2000.*

* cited by examiner

Primary Examiner—Helene Klemanski
(74) Attorney, Agent, or Firm—Tyler A. Stevenson

(57) ABSTRACT

The present invention relates to an ink-jet ink, an ink-jet recording material or an ink-jet system containing at least one water-soluble hindered amine compounds of the general formula (I) or (II): wherein $G_1$ and $G_2$ are independently alkyl of (1) to (4) carbon atoms or are together pentamethylene; $Z_1$ and $Z_2$ are each methyl, or $Z_1$ and $Z_2$ ?together form an unsubstituted linking moiety or a linking moiety substituted by one or more groups selected from an ester, ether, hydroxy, oxo, cyanohydrin, amide, amino, carboxy or an urethane group; E is oxyl; X is an inorganic or organic anion; and wherein the local charge of cations h is equal to the total charge of anions j.

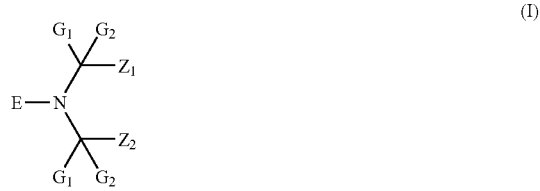

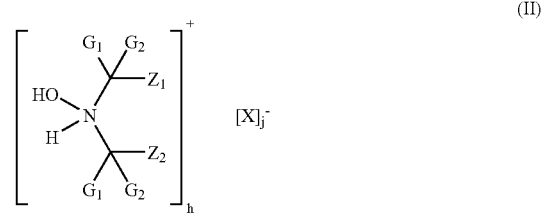

15 Claims, No Drawings

INK-JET INK AND RECORDING MATERIAL

The present invention relates to an ink-jet ink, an ink-jet recording material or an ink-jet system with improved properties.

In the ink-jet process, an image is produced by ejecting ink droplets onto a recording material through a noble. The ink is in most cases an aqueous solution of a dye. The recording material should rapidly and permanently fix the said dye. Specially prepared papers or plastic films provided with a dye-binding layer are mostly used for this purpose. Owing to the fineness of the nozzles, dyes which are completely dissolved in the ink vehicle are preferred to pigments. Besides, dyes offer a higher chroma and a better colour gamut when compared to pigments. However, ink-jet dyes usually have a poorer fastness to light than, for example, the coloured pigments customary in conventional printing inks. As a result, images produced by ink-jet printing usually have a limited lifetime when subjected to light and thus rapidly begin to fade or discolour.

Various classes of substances have already been proposed for this purpose, e.g. water soluble dialkoxybenzenes (EP-A-373 573), water-insoluble phenols, bisphenols, hydroquinones arid hydroquinone diethers (GB 2 088 777), and water soluble phenols and bisphenols (U.S. Pat. No. 5,509, 957 and U.S. Pat. No. 5,089,050). The use of water-insoluble hindered amine compounds in ink-jet ink or media has been reported in e.g. JP-A-2000062310, JP-A-05239389 and JP-A-11348418. The use of specific water-soluble or water-dispersible N-heterocyclic or aliphatic amine compounds in ink-jet inks or media has been disclosed in EP-A-882 600 and JP-A-2000044851. The use of defined nitroxyl compounds in ink jet recording media has been reported in JP11-170 686A2; JP2001-26178A2; JP2001-139851A2.

It has now been found that certain water-soluble sterically hindered amine N-oxyls or N-hydroxyls provide outstanding protection against light-induced fading of ink-jet prints.

The present invention therefore relates to an ink-jet ink containing at least one water-soluble hindered amine compound of the general formula (I) or (II):

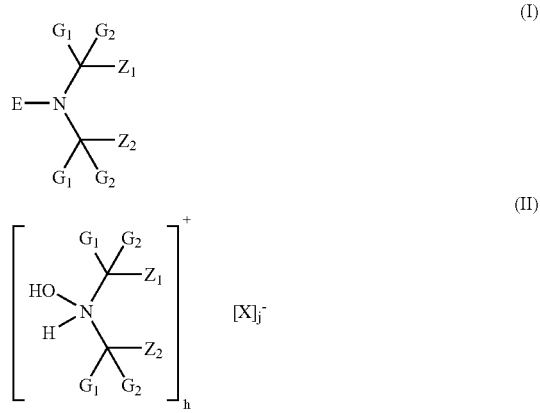

wherein $G_1$ and $G_2$ are independently alkyl of 1 to 4 carbon atoms or are together pentamethylene;

$Z_1$ and $Z_2$ are each methyl, or $Z_1$ and $Z_2$ together form an unsubstituted linking moiety or a linking moiety substituted by one or more groups selected from an ester, ether, hydroxy, oxo, cyanohydrin, amide, amino, carboxy or an urethane group;

E is oxyl;

X is an inorganic or organic anion;

h and j are a number of 1 to 5; and wherein the total charge of cations h is equal to the total charge of anions j.

Preferred are compounds of formula (II).

Examples for X include X as phosphate, carbonate, bicarbonate, nitrate, chloride, bromide, bisulfite, sulfite, bisulfate, sulfate, borate, carboxylate, an alkylsulfonate or an arylsulfonate, or a phosphonate, like, for example, diethylenetriaminepentamethylenephosphonate. X as carboxylate especially is a carboxylate of a mono-, di-, tri- or tetracarboxylic acid, mainly of 1–18 carbon atoms, such as a formate, acetate, benzoate, citrate, oxalate, tartrate, acrylate, polyacrylate, fumarate, maleate, itaconate, glycolate, gluconate, malate, mandelate, tiglate, ascorbate, polymethacrylate, or of nitrilotriacetic acid, hydroxyethylethylenediaminetriacetic acid, ethylenediaminetetraacetic acid or diethylenetriaminepentaacetic acid.

Preferably, X is chloride, bisulfate, sulfate, phosphate, nitrate, ascorbate, formate, acetate, benzoate, oxalate, citrate, a carboxylate of ethylenediaminetetraacetic acid or or of diethylenetriaminepentaacetic acid or polyacrylate, most preferably X is chloride, bisulfate or citrate.

The values h and j are preferably in the range from 1–5.

Preferably, Z1 and Z2 together are a hydrocarbon linking moiety containing 1–200, especially 1–60 carbon atoms and 0–60, especially 0–30 heteroatoms selected from oxygen atoms and nitrogen atoms.

More preferably, Z1 and Z2 as a linking moiety are a chain of 2 or 3 carbon atoms or 1 or 2 carbon atoms and a nitrogen or oxygen atom forming together with the remaining structure in formula (I) or (II) a saturated unsubstituted 5- or 6-membered heterocyclic ring or a 5- or 6-membered heterocyclic ring substituted by one or more groups selected from an ester, ether, hydroxy, oxo, cyanohydrin, amide, amino, carboxy or an urethane group. The substituents in Z1 and Z2 themselves may contain hindered amine moieties. Preferred are compounds of the formula (I) or (II) containing 1–4, especially 1 or 2 hindered amine or hindered ammonium moieties.

Groups denoted as alkyl are, within the definitions given, for example methyl, ethyl, propyl such as n- or isopropyl, butyl such as n-, iso-, sec- and tert-butyl.

Any group denoted as aryl mainly means $C_6$–$C_{12}$aryl, preferably phenyl or naphthyl, especially phenyl.

Groups denoted as alkyl are, within the definitions given, mainly $C_1$–$C_{18}$alkyl, for example methyl, ethyl, propyl such as n- or isopropyl, butyl such as n-, iso-, sec- and tert-butyl, pentyl, hexyl, heptyl, octyl, nonyl, decyl, undecyl, dodecyl, tridecyl, tetradecyl, pentadecyl, hexadecyl, heptadecyl or octadecyl.

Groups denoted as alkylene are, within the definitions given, for example methylene, 1,2-ethylene, 1,1-ethylene, 1,3-propylene, 1,2-propylene, 1,1-propylene, 2,2-propylene, 1,4-butylene, 1,3-butylene, 1,2-butylene, 1,1-butylene, 2,2-butylene, 2,3-butylene, or —$C_5H_{10}$—, —$C_6H_{12}$—, $C_7H_{14}$, —$C_8H_{16}$—, —$C_9H_{18}$—, —$C_{10}H_{20}$—, —$C_{11}H_{22}$—, —$C_{12}H_{24}$—, —$C_{13}H_{26}$—, —$C_{14}H_{28}$—, —$C_{15}H_{30}$—, —$C_{16}H_{32}$—, —$C_{17}H_{34}$—, —$C_{18}H_{36}$—.

Groups denoted as cycloalkyl or cycloalkoxy are mainly $C_5$–$C_{12}$cycloalkyl or $C_5$–$C_{12}$cycloalkoxy, the cycloalkyl part being, for example, cyclopentyl, cyclohexyl, cycloheptyl, cyclooctyl, cyclononyl, cyclodecyl, cycloundecyl or cyclododecyl. Cycloalkenyl is mainly $C_5$–$C_{12}$cycloalkenyl including cyclopentenyl, cyclohexenyl, cycloheptenyl, cyclooctenyl, cyclononenyl, cyclodecenyl, cycloundecenyl, cyclododecenyl.

Aralkyl or aralkoxy is preferably phenylalkyl or phenylalkoxy, which is alkyl or alkoxy substituted by phenyl. Examples for phenylalkyl or phenylalkoxy are, within the definitions given, benzyl, benyloxy, α-methylbenzyl, α-methylbenzyloxy, cumyl, cumyloxy.

Residues alkenyl are mainly alkenyl of 2 to 18 carbon atoms, most preferably allyl.

Residues alkynyl are mainly alkynyl of 2 to 12 carbon atoms, preferred is propargyl.

A group denoted as acyl is mainly R(C=O)—, where R is an aliphatic or aromatic moiety.

An aliphatic or aromatic moiety, such as mentioned above or other definitions, mainly is an aliphatic or aromatic $C_1$–$C_{30}$hydrocarbon; examples are aryl, alkyl, cycloalkyl, alkenyl, cycloalkenyl, bicycloalkyl, bicycloalkenyl, and combinations of these groups.

Examples for acyl groups are alkanoyl of 2 to 12 carbon atoms, alkenoyl of 3 to 12 carbon atoms, benzoyl.

Alkanoyl embraces, for example, formyl, acetyl, propionyl, butyryl, pentanoyl, octanoyl; preferred is $C_2$–$C_8$alkanoyl, especially acetyl.

Residues alkenoyl are most preferably acryloyl or methacryloyl.

The alkyl groups in the different substituents may be linear or branched.

Examples for alkenyl groups with 2 to 4 carbon atoms are ethenyl, propenyl, butenyl. Examples for alkyl groups with 1 to 4 carbon atoms interrupted by one or two oxygen atoms are —$CH_2$—O—$CH_3$, —$CH_2$—$CH_2$—O—$CH_3$, —$CH_2$—$CH_2$—O—$CH_2$—$CH_3$, —$CH_2$—O—$CH_2$—$CH_2$—O—$CH_3$ or —$CH_2$—O—$CH_2$—O—$CH_2$.

Examples for hydroxy substituted alkyl groups with 2 to 6 carbon atoms are hydroxy ethyl, di-hydroxy ethyl, hydroxy propyl, di-hydroxy propyl, hydroxy butyl, hydroxy pentyl or hydroxy hexyl.

The solubility of the compounds of formula (I) or (II) in water at 20° C. and standard pressure is preferably at least 1 g/l, most preferably at least 10 g/l.

The invention also relates to an ink-jet recording material containing at least one water soluble hindered amine of the general formula (I) or (II) as defined above.

Furthermore, the invention relates to an ink-jet system, comprising a recording material and at least one coloured ink to be applied to the recording material by means of an ink-jet nozzle, characterised in that at least either the recording material or at least one coloured ink contains at least one water soluble hindered amine of the general formula (I) or (II) as defined above.

Furthermore, the invention relates to a process for stabilising ink-jet prints which comprises applying to a recording material for ink-jet printing an ink composition containing a water soluble dye or a solution of a dye in an organic solvent and at least one compound of the formula (I) or (II) as defined above and drying said recording material.

In another embodiment the process for stabilising ink-jet prints comprises applying to a recording material for ink-jet printing a casting or coating dispersion or an aqueous or organic solution containing at least one compound of the formula (I) or (II) as defined above and further applying either an ink composition containing a water soluble dye or a solution of a dye in an organic solvent; or an ink composition containing a water soluble dye or a solution of a dye in an organic solvent and at least one compound of the formula (I) or (II) and drying said recording material.

Examples of especially suited compounds of formulae (I) or (II) are those of formulae A to EE and A* to EE* and (III) to (IIIc):

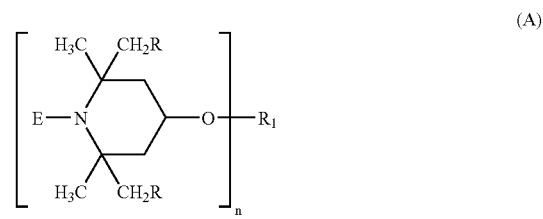

(A)

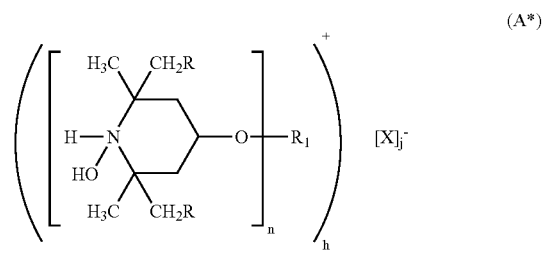

(A*)

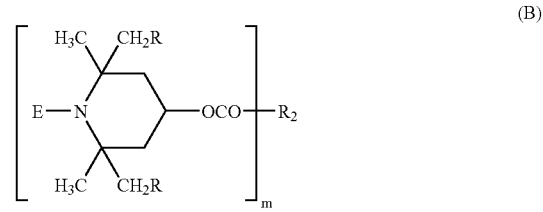

(B)

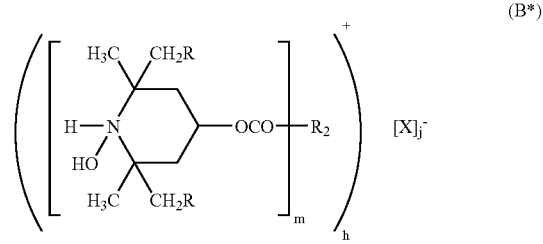

(B*)

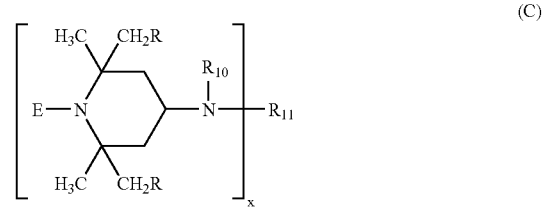

(C)

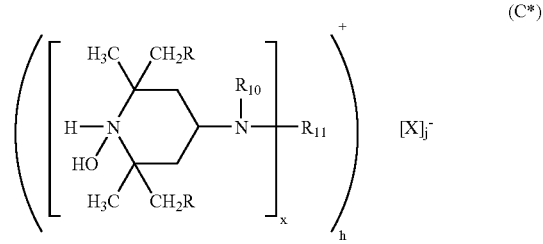

(C*)

-continued
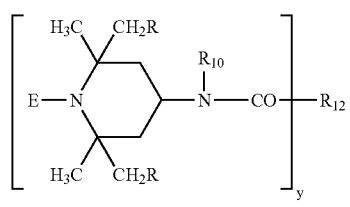 (D)
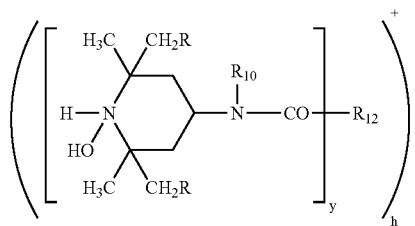 (D*)
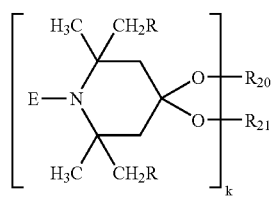 (E)
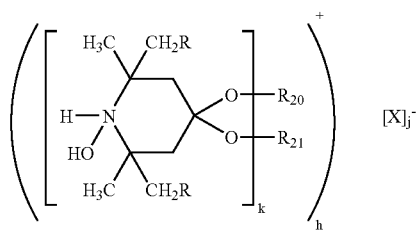 (E*)
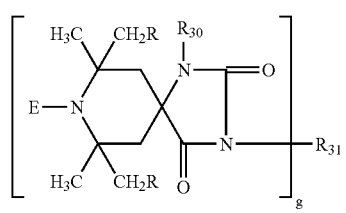 (F)
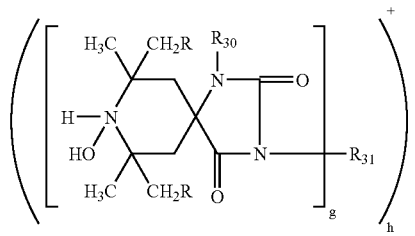 (F*)
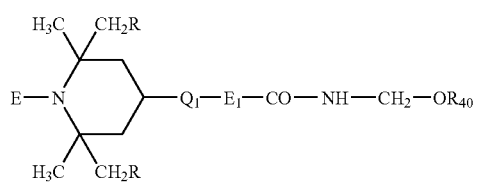 (G)
-continued
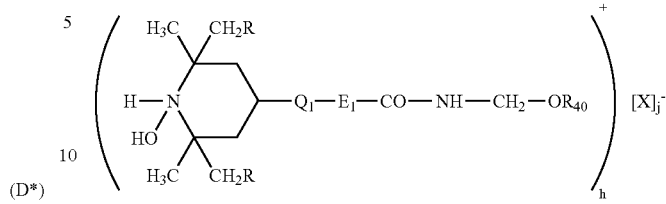 (G*)
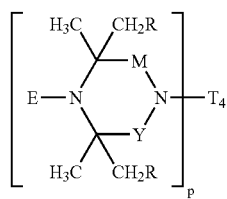 (H)
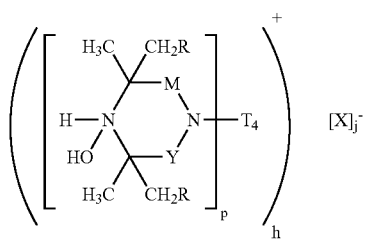 (H*)
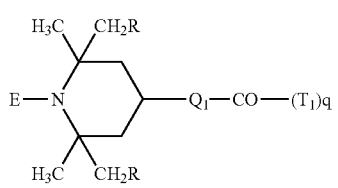 (I)
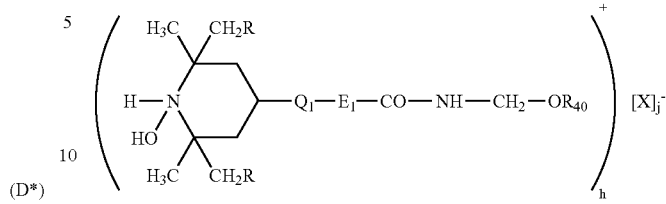 (I*)
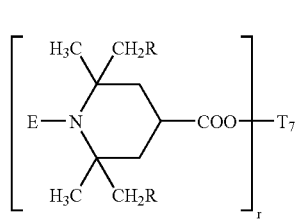 (J)
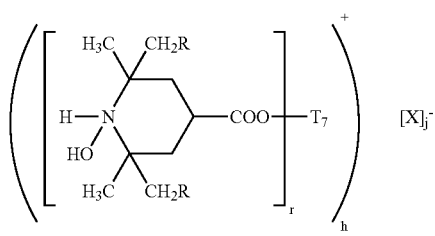 (J*)

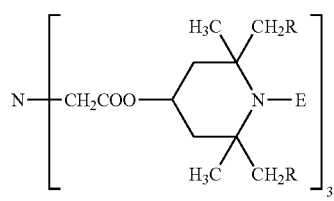
(K)
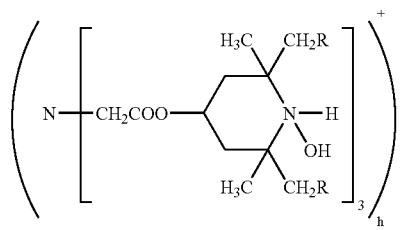
(K*)
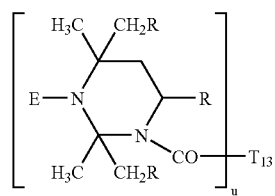
(L)
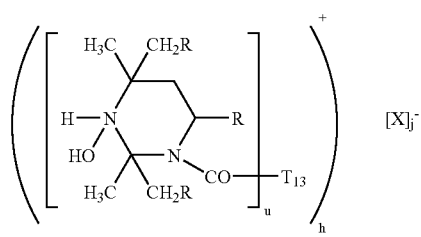
(L*)
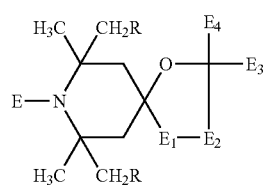
(M)
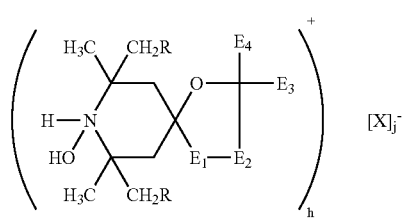
(M*)
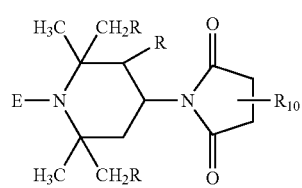
(O)
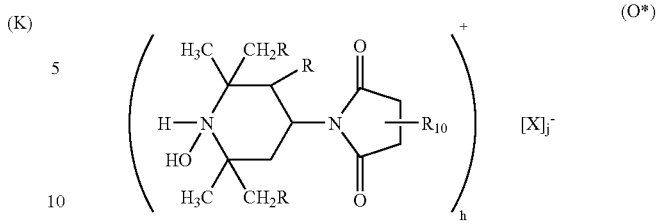
(O*)
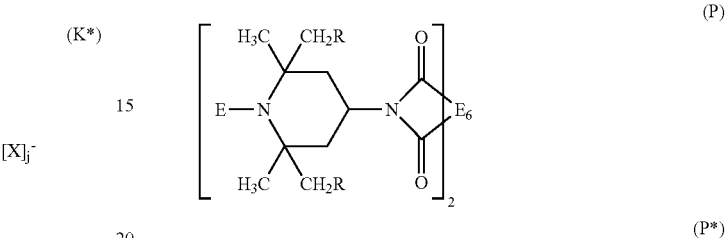
(P)
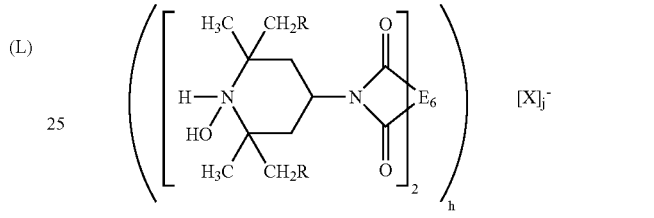
(P*)
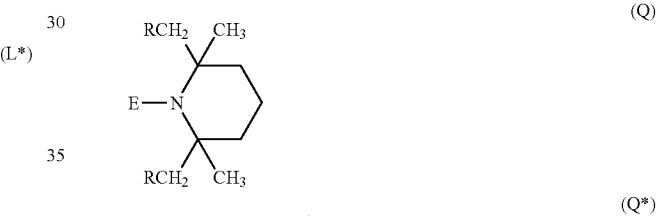
(Q)
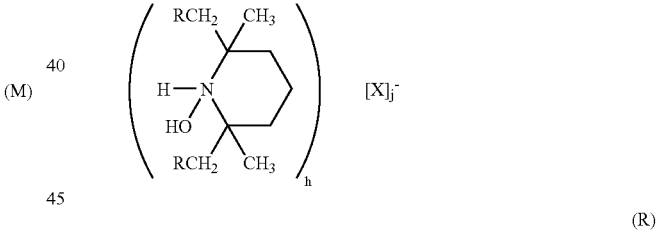
(Q*)
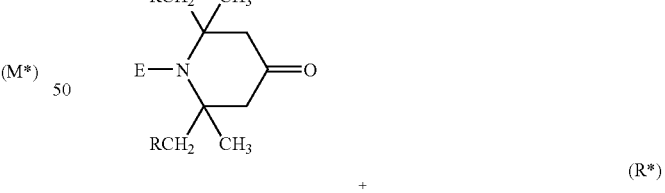
(R)
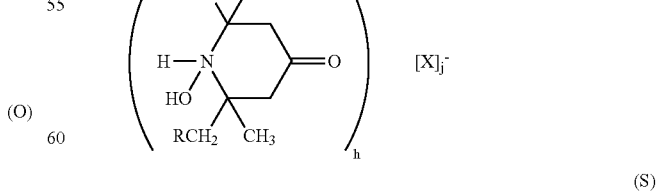
(R*)
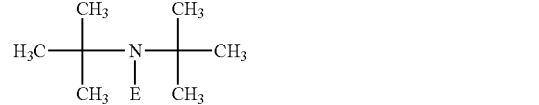
(S)

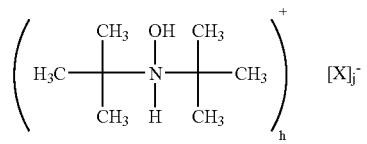 (S*)
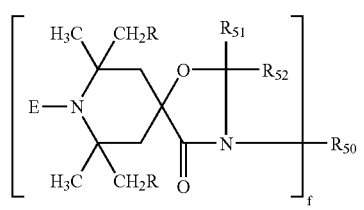 (T)
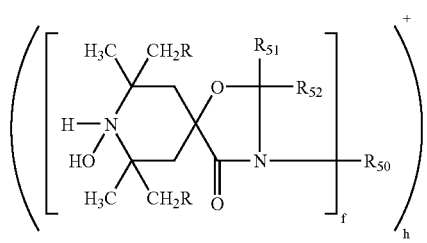 (T*)
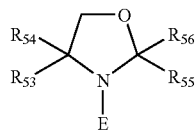 (U)
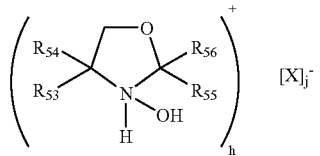 (U*)
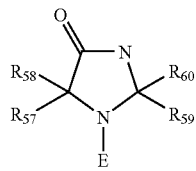 (V)
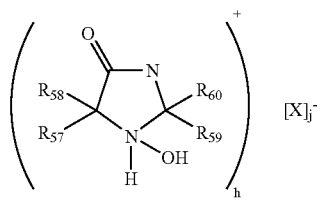 (V*)
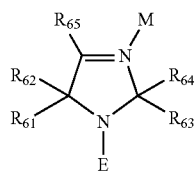 (W)
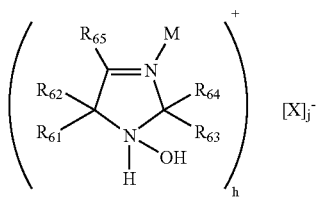 (W*)
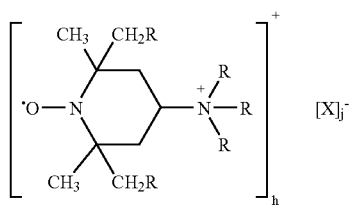 (X)
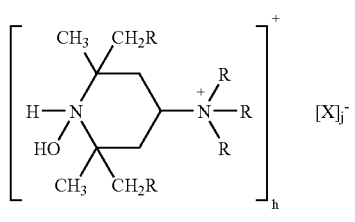 (X*)
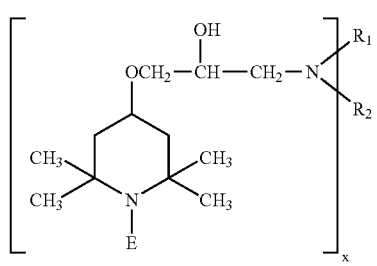 (Y)
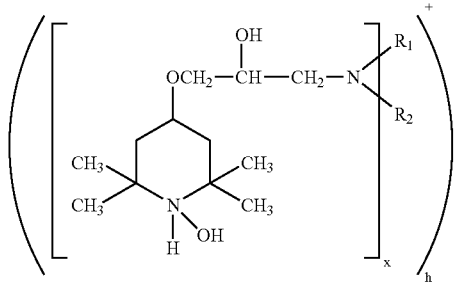 (Y*)
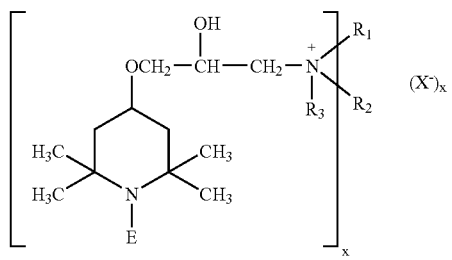 (Z)

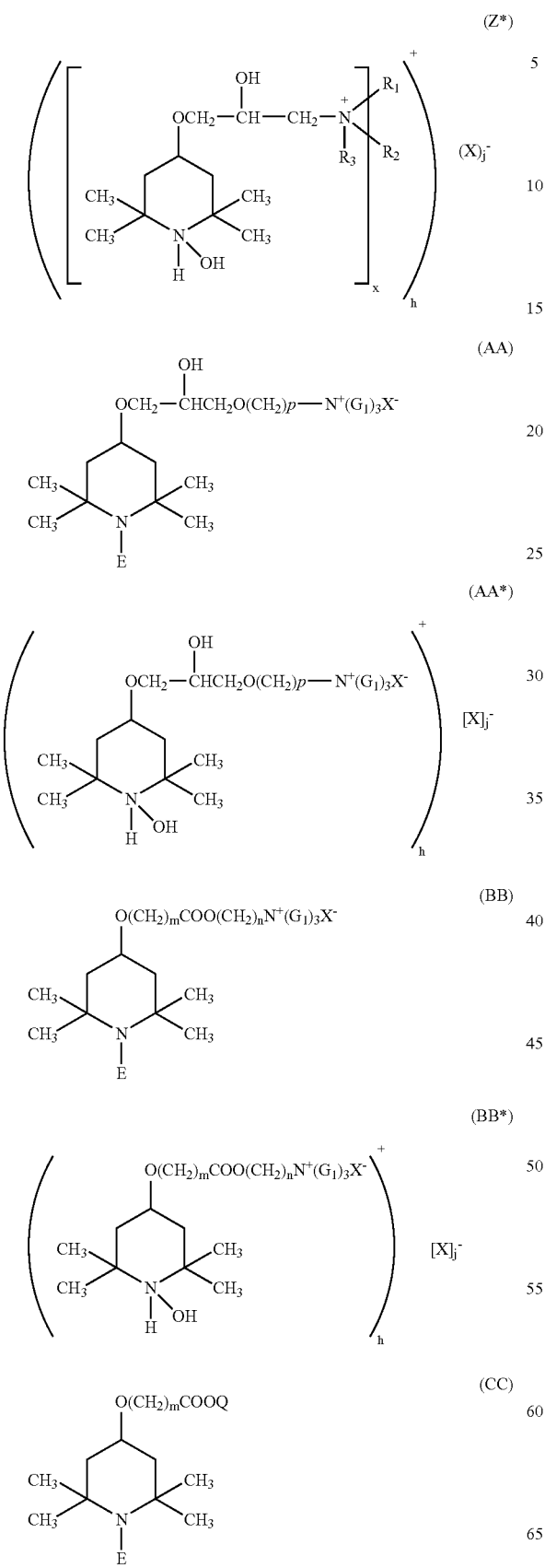
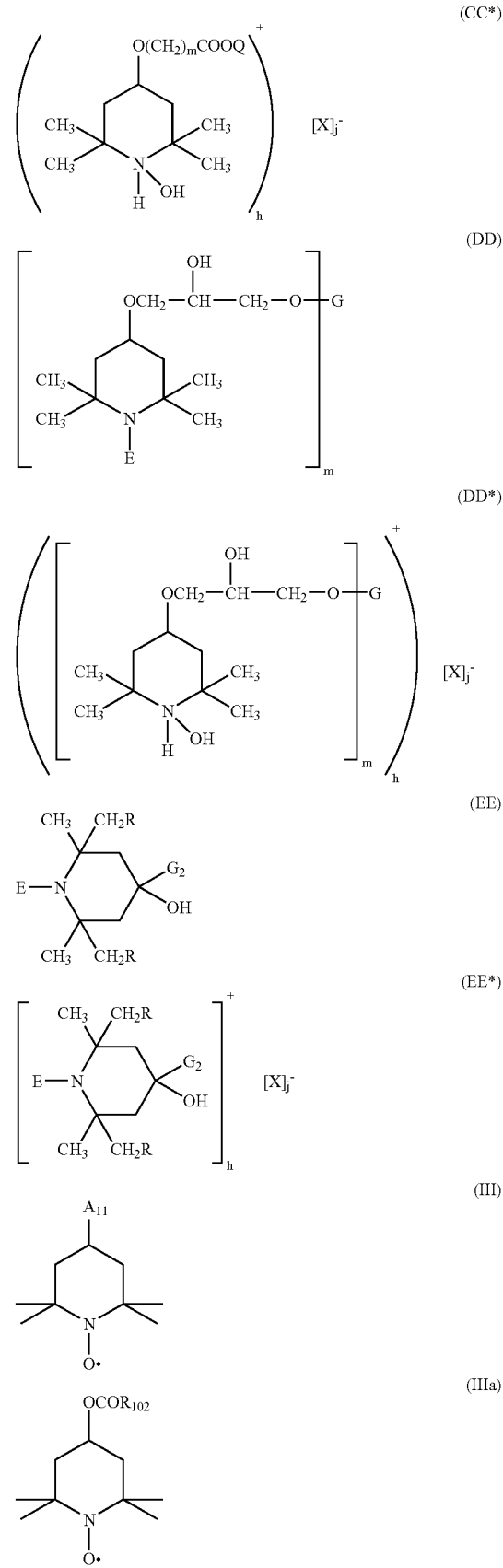

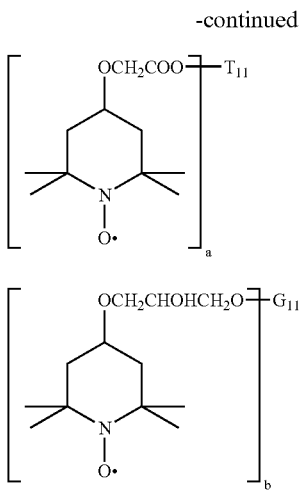

wherein
E is oxyl;
R is hydrogen or methyl; and
in formula A and A* n is 1 or 2, and
when n is 1,
$R_1$ is hydrogen, alkyl of 1 to 18 carbon atoms, alkenyl of 2–18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
$R_1$ is alkyl of 1 to 4 carbon atoms substituted by a carboxy group or by —COOZ where Z is hydrogen, alkyl of 1 to 4 carbon atoms or phenyl, or where Z is said alkyl substituted by —(COO$^-$)$_n$M$^{n+}$ where n is 1–3 and M is a metal ion from the 1 st, 2nd or 3rd group of the periodic table or is Zn, Cu, Ni or Co, or M is a group N$^{n+}$(R$_2$)$_4$ where $R_2$ is alkyl of 1 to 8 carbon atoms or benzyl,
when n is 2,
$R_1$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups;
in formula B and B* m is 1 to 4, and
when m is 1,
$R_2$ is alkyl of 1 to 18 carbon atoms, alkyl of 3 to 18 carbon atoms interrupted by —COO—, alkyl of 3 to 18 carbon atoms substituted by COOH or COO—, or $R_2$ is —CH$_2$(OCH$_2$CH$_2$)$_n$OCH$_3$ where n is 1 to 12, or
$R_2$ is cycloalkyl of 5 to 12 carbon atoms, aryl of 6 to 12 carbon atoms, or said aryl substituted by one to four alkyl groups of 1 to 4 carbon atoms, or
$R_2$ is —NHR$_3$ where $R_3$ is alkyl of 1 to 18 carbon atoms, cycloalkyl of 5 to 12 carbon atoms, aryl of 6 to 12 carbon atoms, or said aryl substituted by one to four alkyl of 1 to 4 carbon atoms, or
$R_2$ is —N(R$_3$)$_2$ where $R_3$ is as defined above,
when m is 2,
$R_2$ is alkylene of 1 to 12 carbon atoms, alkenylene of 4 to 12 carbon atoms, xylylene, alkylene of 2 to 12 carbon atoms interrupted by —COO—, alkylene of 3 to 18 carbon atoms substituted by COOH or COO—, or $R_2$ is —CH$_2$(OCH$_2$CH$_2$)$_n$OCH$_2$— where n is 1 to 12, or $R_2$ is cycloalkylene of 5 to 12 carbon atoms, aralkylene of 7 to 15 carbon atoms or arylene of 6 to 12 carbon atoms, or
$R_2$ is —NHR$_4$NH— where $R_4$ is alkylene of 2 to 18 carbon atoms, cycloalkylene of 5 to 12 carbon atoms, aralkylene of 8 to 15 carbon atoms or arylene of 6 to 12 carbon atoms, or
$R_2$ is —N(R$_3$)R$_4$N(R$_3$)— where $R_3$ and $R_4$ are as defined above, or
$R_2$ is —CO— or —NH—CO—NH—,
when m is 3,
$R_2$ is alkanetriyl of 3 to 8 carbon atoms or benzenetriyl, or
when m is 4,
$R_2$ is alkanetetrayl of 5 to 8 carbon atoms or benzenetetrayl,
in formula C and C*,
$R_{10}$ is hydrogen, alkyl of 1 to 18 carbon atoms, cycloalkyl of 5 to 12 carbon atoms, aralkyl of 7 to 15 carbon atoms, alkanoyl of 2 to 18 carbon atoms, alkenoyl of 3 to 5 carbon atoms or benzoyl,
x is 1 or 2, and
when x is 1,
$R_{11}$ is hydrogen, alkyl of 1 to 18 carbon atoms, alkenyl of 2 to 18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
$R_{11}$ is alkyl of 1 to 4 carbon atoms substituted by a carboxy group or by —COOZ where Z is hydrogen, alkyl of 1 to 4 carbon atoms or phenyl, or where Z is said alkyl substituted by —(COO$^-$)$_n$M$^{n+}$ where n is 1–3 and M is a metal ion from the 1st, 2nd or 3rd group of the periodic table or is Zn, Cu, Ni or Co, or M is a group N$^{n+}$(R$_2$)$_4$ where $R_2$ is hydrogen, alkyl of 1 to 8 carbon atoms or benzyl, or
when x is 2,
$R_{11}$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups,
in formula D and D* y is 1 to 4,
$R_{10}$ is as defined above,
and $R_{12}$ is defined as $R_2$ above,
in formula E and E* k is 1 or 2,
when k is 1,
$R_{20}$ and $R_{21}$ are independently alkyl of 1 to 12 carbon atoms, alkenyl of 2 to 12 carbon atoms or aralkyl of 7 to 15 carbon atoms, or $R_{20}$ is also hydrogen, or
$R_{20}$ and $R_{21}$ together are alkylene of 2 to 8 carbon atoms or said alkylene substituted by hydroxyl, or are acyloxyalkylene of 4 to 22 carbon atoms, or
when k is 2,
$R_{20}$ and $R_{21}$ are together (—CH$_2$)$_2$C(CH$_2$—)$_2$,
in formula F and F*,
$R_{30}$ is hydrogen, alkyl of 1 to 18 carbon atoms, benzyl, glycidyl, or alkoxyalkyl of 2 to 6 carbon atoms,
g is 1 or 2,
when g is 1, $R_{31}$ is defined as $R_1$ above when n is 1,
when g is 2, $R_{31}$ is defined as $R_1$ above when n is 2,
in formula G and G*,
$Q_1$ is —NR$_{41}$— or —O—,
$E_1$ is alkylene of 1 to 3 carbon atoms, or $E_1$ is —CH$_2$—CH(R$_{42}$)—O— where $R_{42}$ is hydrogen, methyl or phenyl, or
$E_1$ is —(CH$_2$)$_3$—NH— or $E_1$ is a direct bond, $R_{40}$ is hydrogen or alkyl of 1 to 18 carbon atoms,
$R_{41}$ is hydrogen, alkyl of 1 to 18 carbon atoms, cycloalkyl of 5 to 12 carbon atoms, aralkyl of 7 to 15 carbon atoms, aryl of 6 to 10 carbon atoms, or $R_{41}$ is —$CH_2$—CH($R_{42}$)—OH where $R_{42}$ is as defined above,
in formula H and H* p is 1 or 2,
$T_4$ is as defined for $R_{11}$ when x is 1 or 2,
M and Y are independently methylene or carbonyl, preferably M is methylene and Y is carbonyl,
in formula(I)and I*,
this formula denotes a recurring structural unit of a polymer where $T_1$ is ethylene or 1,2-propylene or is the repeating structural unit derived from an alpha-olefin copolymer with an alkyl acrylate or methacrylate, and where
q is 2 to 100,
$Q_1$ is —N($R_{41}$)— or —O— where $R_{41}$ is as defined above,
in formula J and J*,
r is 1 or 2,
$T_7$ is as defined for $R_1$ when n is 1 or 2 in formula A, preferably $T_7$ is octamethylene when r is 2,
in formula L and L* u is 1 or 2,
$T_{13}$ is as defined for $R_1$ when n is 1 or 2 in formula A, with the proviso that $T_{13}$ is not hydrogen when u is 1,
in formula M and M*,
$E_1$ and $E_2$, being different, each are —CO— or —N($E_5$)— where $E_5$ is hydrogen, alkyl of 1 to 12 carbon atoms or alkoxycarbonylalkyl of 4 to 22 carbon atoms, preferably $E_1$ is —CO— and $E_2$ is —N($E_5$)—,
$E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms,
$E_4$ is hydrogen, alkyl of 1 to 30 carbon atoms, phenyl, naphthyl or phenylalkyl of 7 to 12 carbon atoms, or
$E_3$ and $E_4$ together are polymethylene of 4 to 17 carbon atoms, or said polymethylene substituted by one to four alkyl of 1 to 4 carbon atoms, preferably methyl,
in formula O and O*,
$R_{10}$ is as defined for $R_{10}$ in formula C,
in formula P and P*,
$E_6$ is an aliphatic or aromatic tetravalent radical, preferably neopentanetetrayl or benzenetetrayl,
in formula T and T*,
$R_{51}$ is hydrogen, alkyl of 1 to 18 carbon atoms, cycloalkyl of 5 to 12 carbon atoms, or aryl of 6 to 10 carbon atoms,
$R_{52}$ is hydrogen or alkyl of 1 to 18 carbon atoms, or
$R_{51}$ and $R_{52}$ together of alkylene of 4 to 8 carbon atoms,
f is 1 or 2,
when f is 1,
$R_{50}$ is as defined for $R_{11}$ in formula C when x is 1, or $R_{50}$ is —($CH_2$)$_z$COO$R_{54}$ where z is 1 to 4 and
$R_{54}$ is hydrogen or alkyl of 1 to 18 carbon atoms, or $R_{54}$ is a metal ion from the 1st, 2nd or 3rd group of the periodic table or a group —N($R_{55}$)$_4$ where $R_{55}$ is hydrogen, alkyl of 1 to 12 carbon atoms or benzyl,
when f is 2,
$R_{50}$ is as defined for $R_{11}$ in formula C when x is 2,
in formula U and U*,
$R_{53}$, $R_{54}$, $R_{55}$ and $R_{56}$ are independently alkyl of 1 to 4 carbon atoms or are together pentamethylene.
in formula V and V*,
$R_{57}$, $R_{58}$, $R_{59}$ and $R_{60}$ are independently alkyl of 1 to 4 carbon atoms or are together pentamethylene.
in formula W and W*,
$R_{61}$, $R_{62}$, $R_{63}$ and $R_{64}$ are independently alkyl of 1 to 4 carbon atoms or are together pentamethylene, $R_{65}$ is alkyl of 1 to 5 carbon atoms,
M is hydrogen or oxygen,
wherein in formulas X to CC and X* to CC*
n is 2 to 3,
$G_1$ is hydrogen, methyl, ethyl, butyl or benzyl,
m is 1 to 4,
x is 1 to 4,
when x is 1, $R_1$ and $R_2$ are independently alkyl of 1 to 18 carbon atoms, said alkyl interrupted by one to five oxygen atoms, said alkyl substituted by 1 to 5 hydroxyl groups or said alkyl both interrupted by said oxygen atoms and substituted by said hydroxyl groups; cycloalkyl of 5 to 12 carbon atoms, aralkyl of 7 to 15 carbon atoms, aryl of 6 to 10 carbon atoms or said aryl substituted by one to three alkyl of 1 to 8 carbon atoms, or $R_1$ is also hydrogen, or $R_1$ and $R_2$ are together tetramethylene, pentamethylene, hexamethylene or 3-oxapentamethylene,
when x is 2,
$R_1$ is hydrogen, alkyl of 1 to 8 carbon atoms, said alkyl interrupted by one or two oxygen atoms, said alkyl substituted by a hydroxyl group, or said alkyl both interrupted by one or two oxygen atoms and substituted by a hydroxyl group,
$R_2$ is alkylene of 2 to 18 carbon atoms, said alkylene interrupted by one to five oxygen atoms, said alkylene substituted by 1 to 5 hydroxyl groups or said alkylene both interrupted by said oxygen atoms and substituted by said hydroxyl groups; o-, m- or p-phenylene or said phenylene substituted by one or two alkyl of 1 to 4 carbon atoms, or
$R_2$ is —($CH_2$)$_k$O[($CH_2$)$_k$O]$_h$($CH_2$)$_k$— where k is 2 to 4 and h is 1 to 40, or
$R_1$ and $R_2$ together with the two N atoms to which they are attached are piperazin-1,4-diyl,
when x is 3,
$R_1$ is hydrogen,
$R_2$ is alkylene of 4 to 8 carbon atoms interrupted by one nitrogen atom,
when x is 4,
$R_1$ is hydrogen,
$R_2$ is alkylene of 6 to 12 carbon atoms interrupted by two nitrogen atoms,
$R_3$ is hydrogen, alkyl of 1 to 8 carbon atoms, said alkyl interrupted by one or two oxygen atoms, said alkyl substituted by a hydroxyl group, or both interrupted by one or two oxygen atoms and substituted by a hydroxyl group,
p is 2 or 3, and
Q is an alkali metal salt, ammonium or N$^+$($G_1$)$_4$,
and in formula DD and DD*
m is 2 or 3,
when m is 2,
G is —($CH_2$CHR—O)$_r$$CH_2$CHR—, where r is 0 to 3, and R is hydrogen or methyl, and
when m is 3, G is glyceryl,
in formula EE and EE*
$G_2$ is —CN, —CONH$_2$ or —COO$G_3$ where $G_3$ is hydrogen, alkyl of 1 to 18 carbon atoms or phenyl
X is an inorganic or organic anion, such as phosphate, phosphonate, carbonate, bicarbonate, nitrate, chloride, bromide, bisulfite, sulfite, bisulfate, sulfate, borate, formate, acetate, benzoate, citrate, oxalate, tartrate, acrylate, polyacrylate, fumarate, maleate, itaconate, glycolate, gluconate, malate, mandelate, tiglate, ascorbate, polymethacrylate, a carboxylate of nitrilotriacetic acid, hydroxyethylethylenediaminetriacetic acid, ethylenediaminetetraacetic acid or of diethylenetriaminepentaacetic acid, a diethylenetriaminepentamethylenephosphonate, an alkylsulfonate or an arylsulfonate, and where the total charge of cations h is equal to the total charge of anions j;

in formulae (III) to (IIIc)

A11 is $OR_{101}$ or $NR_{111}R_{112}$ $R_{101}$ is alkenyl of 2 to 4 carbon atoms, propargyl, glycidyl, alkyl of 2 to 6 carbon atoms interrupted by one or two oxygen atoms, substituted by one to three hydroxyl groups or both interrupted by said oxygen atoms and substituted by said hydroxyl groups, or $R_{101}$ is alkyl of 1 to 4 carbon atoms substituted by carboxy or by the alkali metal, ammonium or $C_1$–$C_4$alkylammonium salts thereof; or $R_{101}$ is alkyl substituted by $COOE_{10}$ where $E_{10}$ is methyl or ethyl, $R_{102}$ is alkyl of 3 to 5 carbon atoms interrupted by —COO— or by —CO—, or $R_{102}$ is —$CH_2(OCH_2CH_2)_cCOCH_3$ where c is 1 to 4; or $R_{102}$ is —$NHR_{103}$ where $R_{103}$ is alkyl of 1 to 4 carbon atoms, a is 2 to 4, when a is 2, $T_{11}$ is —$(CH_2CHR_{100}$—$O)_dCH_2CHR_{100}$—, where d is 0 or 1, and $R_{100}$ is hydrogen or methyl, when a is 3, $T_{11}$ is glyceryl, when a is 4, $T_{11}$ is neopentanetetrayl, b is 2 or 3, when b is 2, $G_{11}$ is —$(CH_2CHR_{100}$—$O)_dCH_2CHR_{100}$—, where d is 0 or 1, and $R_{100}$ is hydrogen or methyl, and when b is 3, $G_{11}$ is glyceryl;

$R_{111}$ is hydrogen, unsubstituted alkyl of 1 to 4 carbon atoms, alkyl of 1 to 4 carbon atoms substituted by one or two hydroxyl, alkyl of 1 to 4 carbon atoms interrupted by one or two oxygen atoms, or both substituted by one hydroxyl and interrupted by one or two oxygen atoms, $R_{112}$ is —CO—$R_{113}$ where $R_{113}$ has the same meaning as $R_{111}$, or $R_{113}$ is $NHR_{114}$, wherein $R_{114}$ is unsubstituted alkyl of 1 to 4 carbon atoms, alkyl of 1 to 4 carbon atoms substituted by one or two hydroxyl, alkyl of 1 to 4 carbon atoms substituted by alkoxy of 1 to 2 carbon atoms, or both substituted by one hydroxyl and by alkoxy of 1 to 2 carbon atoms, or $R_{111}$ and $R_{112}$ together are —CO—$CH_2CH_2$—CO—, or $(CH_2)_6CO$—; and with the proviso that when $R_{113}$ is alkyl of 1 to 4 carbon atoms, $R_{111}$ is not hydrogen.

Preferred compounds of general formulae (I) or (II) are those of formulae A, A*, B, B*, C, C*, D, D*, Q, Q*, R, R*, S, S*, X, X*, Y, Y*, Z and Z*, wherein E is oxyl;

R is hydrogen;

in formula A and A* n is 1 or 2, when n is 1, $R_1$ is hydrogen, alkyl of 1 to 6 carbon atoms, alkenyl of 2–6 carbon atoms, propargyl, glycidyl, alkyl of 2 to 20 carbon atoms interrupted by one to ten oxygen atoms, said alkyl substituted by one to five hydroxyl groups or both interrupted by said oxygen atoms and substituted by said hydroxyl groups, or $R_1$ is alkyl of 1 to 4 carbon atoms substituted by a carboxy group or by —COOZ where Z is hydrogen or alkyl of 1 to 4 carbon atoms, when n is 2, $R_1$ is alkylene of 1 to 8 carbon atoms, alkenylene of 4 to 8 carbon atoms, alkylene of 1 to 20 carbon atoms interrupted by one to ten oxygen atoms, substituted by one to five hydroxyl groups or both interrupted by said oxygen atoms and substituted by said hydroxyl groups, in formula B and B* m is 1 or 2 when m is 1, $R_2$ is alkyl of 1 to 4 carbon atoms or $R_2$ is $CH_2(OCH_2CH_2)_nOCH_3$ where n is 1 to 12, or $R_2$ is phenyl, or said phenyl substituted by one to three methyl groups, or $R_2$ is —$NHR_3$ where $R_3$ is alkyl of 1 to 4 carbon atoms or phenyl, or said phenyl substituted by one or two methyl groups, when m is 2, $R_2$ is alkylene of 1 to 8 carbon atoms, alkenylene of 4 to 8 carbon atoms, or $R_2$ is —$CH_2(OCH_2CH_2)_nOCH_2$— where n is 1 to 12, or $R_2$ is $NHR_4NH$ where $R_4$ is of 2 to 6 carbon atoms, aralkylene of 8 to 15 carbon atoms or arylene of 6 to 12 carbon atoms, or $R_2$ is —CO— or —NHCONH, in formula C and C*, $R_{10}$ is hydrogen or, alkanoyl of 1 to 3 carbon atoms, x is 1 or 2, when x is 1, $R_{11}$ is hydrogen, alkyl of 1 to 6 carbon atoms or glycidyl, or $R_{11}$ is alkyl of 1 to 4 carbon atoms substituted by a carboxy group or by COOZ where Z is hydrogen or alkyl of 1 to 4 carbon atoms, when x is 2, $R_{11}$ is alkylene of 1 to 6 carbon atoms, in formula D and D*, $R_{10}$ is hydrogen, y is 1 or 2, $R_{12}$ is defined as $R_2$ above, in formula Y, Y*, Z and Z*, x is 1 or 2, when x is 1, $R_1$ and $R_2$ are independently alkyl of 1 to 4 carbon atoms or $R_1$ and $R_2$ are together tetramethylene, or pentamethylene, $R_2$ is hydrogen or alkyl of 1 to 4 carbon atoms, said alkyl group substituted by a hydroxyl group, when x is 2, $R_1$ is hydrogen, alkyl of 1 to 4 carbon atoms, said alkyl substituted by a hydroxyl group, $R_2$ is alkylene of 2 to 6 carbon atoms, $R_3$ is as defined above.

Especially preferred compounds of formulae (I) or (II) are those of formulae A, A*, B, B*, C, C*, D, D*, Q, Q*, R and R*, wherein E is oxyl and R is hydrogen, in formula A and A*, h is 1, $R_1$ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or $R_1$ is alkyl of 1 to 4 carbon atoms substituted by —COOZ where Z is hydrogen or alkyl of 1 to 4 carbon atoms, in formula B and B*, m is 1 or 2, $R_2$ is alkyl of 1 to 4 carbon atoms or $R_2$ is $CH_2(OCH_2CH)_nOCH_3$ where n is 1 to 4, when m is 2, $R_2$ is alkylene of 1 to 8 carbon atoms, in formula C and C*, $R_{10}$ is hydrogen or alkanoyl of 1 or 2 carbon atoms,
x is 1 or 2,
when x is 1,
$R_{11}$ is hydrogen, alkyl of 1 to 4 carbon atoms or glycidyl,
$R_{11}$ is alkyl of 1 to 4 carbon atoms substituted by COOZ where Z is hydrogen or alkyl of 1 to 4 carbon atoms,
when x is 2,
$R_{11}$ is alkylene of 1 to 6 carbon atoms,
in formula D and D*,
$R_{10}$ is hydrogen,
y is 1 or 2,
$R_{12}$ is defined as $R_2$ above.

More particularly, the hindered amine compound is
(a) bis(1-oxyl-2,2-6-6-tetramethylpiperidin-4-yl)sebacate;
(b) 1-hydroxy-2,2-6-6-tetramethyl-4-acetoxypiperidinium citrate;
(c) 1-oxyl-2,2,6,6-tetramethyl-4-acetamidopiperidine;
(d) 1-hydroxy-2,2,6,6-tetramethyl-4-acetamidopiperidinium bisulfate;
(e) 1-oxyl-2,2,6,6-tetramethyl-4-oxo-piperidine;
(f) 1-hydroxy-2,2,6,6-tetramethyl-4-oxo-piperidinium acetate;
(g) 1-oxyl-2,2,6,6-tetramethyl-4-methoxy-piperidine;
(h) 1-hydroxy-2,2,6,6-tetramethyl-4-methoxy-piperidinium acetate;
(i) 1-oxyl-2,2,6,6-tetramethyl-4-acetoxypiperidine;
(j) 1-oxyl-2,2,6,6-tetramethyl-4-propoxy-piperidine;
(k) 1-hydroxy-2,2,6,6-tetramethyl-4-propoxy-piperidinium acetate;
(l) 1-oxyl-2,2,6,6-tetramethyl-4-(2-hydroxy-4-oxapentoxy)piperidine;
(m) 1-hydroxy-2,2,6,6-tetramethyl-4-(2-hydroxy-4-oxapentoxy)piperidinium acetate;
(n) 1-oxyl-2,2,6,6-tetramethyl-4-hydroxypiperidine;
(o) 1-hydroxy-2,2,6,6-tetramethyl-4-hydroxypiperidinium chloride;
(p) 1-hydroxy-2,2,6,6-tetramethyl-4-hydroxypiperidinium acetate;
(q) 1-hydroxy-2,2,6,6-tetramethyl-4-hydroxypiperidinium bisulfate;
(r) 1-hydroxy-2,2,6,6-tetramethyl-4-hydroxypiperidinium citrate;
(s) bis(1-hydroxy-2,2,6,6-tetramethyl-4-hydroxypiperidinium)citrate;
(t) tris(1-hydroxy-2,2,6,6-tetramethyl-4-hydroxypiperidinium)citrate.
(u) tetra(1-hydroxy-2,2,6,6-tetramethyl-4-hydroxypiperidinium)ethylenediaminetetraacetate;
(v) tetra(1-hydroxy-2,2,6,6-tetramethyl-4-acetamidopiperidinium)ethylenediaminetetraacetate;
(w) tetra(1-hydroxy-2,2,6,6-tetramethyl-4-oxopiperidinium)ethylenediaminetetraacetate;
(x) penta(1-hydroxy-2,2,6,6-tetramethyl-4-hydroxypiperidinium)diethylenetriaminepentaacetate;
(y) penta(1-hydroxy-2,2,6,6-tetramethyl-4-acetamidopiperidinium)diethylenetriaminepentaacetate;
(z) penta(1-hydroxy-2,2,6,6-tetramethyl-4-oxopiperidinium)diethylenetriaminepentaacetate;
(aa) tri(1-hydroxy-2,2,6,6-tetramethyl-4-hydroxypiperidinium)nitrilotriacetate;
(bb) tri(1-hydroxy-2,2,6,6-tetramethyl-4-acetamidopiperidinium)nitrilotriacetate;
(cc) tri(1-hydroxy-2,2,6,6-tetramethyl-4-oxopiperidinium)nitrilotriacetate;
(dd) penta(1-hydroxy-2,2,6,6-tetramethyl-4-hydroxypiperidinium)diethylenetriaminepentamethylenephosphonate;
(ee) penta(1-hydroxy-2,2,6,6-tetramethyl-4-acetamidopiperidinium)diethylenetriaminepentamethylenephosphonate;
(ff) penta(1-hydroxy-2,2,6,6-tetramethyl-4-oxopiperidinium)diethylenetriaminepentamethylenephosphonate Most preferably, the hindered amine compound is
(a) 1-oxyl-2,2,6,6-tetramethyl-4-hydroxypiperidine;
(b) 1-hydroxy-2,2,6,6-tetramethyl-4-hydroxypiperidinium chloride;
(c) 1-hydroxy-2,2,6,6-tetramethyl-4-hydroxypiperidinium acetate;
(d) 1-hydroxy-2,2,6,6-tetramethyl-4-hydroxypiperidinium bisulfate;
(e) 1-hydroxy-2,2,6,6-tetramethyl-4-hydroxypiperidinium citrate;
(f) bis(1-hydroxy-2,2,6,6-tetramethyl-4-hydroxypiperidinium)citrate;
(g) tris(1-hydroxy-2,2,6,6-tetramethyl-4-hydroxypiperidinium)citrate;
(h) tetra(1-hydroxy-2,2,6,6-tetramethyl-4-hydroxypiperidinium)ethylenediaminetetraacetate;
(i) tetra(1-hydroxy-2,2,6,6-tetramethyl-4-acetamidopiperidinium)ethylenediaminetetraacetate;
(j) tetra(1-hydroxy-2,2,6,6-tetramethyl-4-oxopiperidinium) ethylenediaminetetraacetate;
(k) penta(1-hydroxy-2,2,6,6-tetramethyl-4-hydroxypiperidinium)diethylenetriaminepentaacetate;
(l) penta(1-hydroxy-2,2,6,6-tetramethyl-4-acetamidopiperidinium)diethylenetriaminepentaacetate;
(m) penta(1-hydroxy-2,2,6,6-tetramethyl-4-oxopiperidinium)diethylenetriaminepentaacetate.

As mentioned above the compounds of formula (II) are preferred. Thus, a preferred embodiment of the invention relates to an ink-jet ink, ink-jet recording material or ink-jet system, wherein the compound of formula (II) is of formula A*, B*, C*, D*, Q* or R*, wherein
R is hydrogen
in formula A*,
h is 1,
$R_1$ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or
$R_1$ is alkyl of 1 to 4 carbon atoms substituted by —COOZ where Z is hydrogen or alkyl of 1 to 4 carbon atoms,
in formula B*,
m is 1 or 2,
$R_2$ is alkyl of 1 to 4 carbon atoms or $R_2$ is $CH_2(OCH_2CH_2)_nOCH_3$ where n is 1 to 4,
when m is 2,
$R_2$ is alkylene of 1 to 8 carbon atoms,
in formula C*,
$R_{10}$ is hydrogen or alkanoyl of 1 or 2 carbon atoms,
x is 1 or 2,
when x is 1,
$R_{11}$ is hydrogen, alkyl of 1 to 4 carbon atoms or glycidyl,
$R_{11}$ is alkyl of 1 to 4 carbon atoms substituted by COOZ where Z is hydrogen or alkyl of 1 to 4 carbon atoms,
when x is 2,
$R_{11}$ is alkylene of 1 to 6 carbon atoms,
in formula D*,
$R_{10}$ is hydrogen,
y is 1 or 2,
$R_{12}$ is defined as $R_2$ above.

Suitable examples of compounds of the formula (II) are selected from
(a) 1-hydroxy-2,2-6-6-tetramethyl-4-acetoxypiperidinium citrate;
(b) 1-hydroxy-2,2,6,6-tetramethyl-4-acetamidopiperidinium bisulfate;
(c) 1-hydroxy-2,2,6,6-tetramethyl-4-oxo-piperidinium acetate;
(d) 1-hydroxy-2,2,6,6-tetramethyl-4-methoxy-piperidinium acetate;
(e) 1-hydroxy-2,2,6,6-tetramethyl-4-propoxy-piperidinium acetate;
(f) 1-hydroxy-2,2,6,6-tetramethyl-4-(2-hydroxy-4-oxapentoxy)piperidinium acetate;
(g) 1-hydroxy-2,2,6,6-tetramethyl-4-hydroxypiperidinium chloride;
(h) 1-hydroxy-2,2,6,6-tetramethyl-4-hydroxypiperidinium acetate;
(i) 1-hydroxy-2,2,6,6-tetramethyl-4-hydroxypiperidinium bisulfate;
(j) 1-hydroxy-2,2,6,6-tetramethyl-4-hydroxypiperidinium citrate;
(k) bis(1-hydroxy-2,2,6,6-tetramethyl-4-hydroxypiperidinium)citrate;
(l) tris(1-hydroxy-2,2,6,6-tetramethyl-4-hydroxypiperidinium)citrate;
(m) tetra(1-hydroxy-2,2,6,6-tetramethyl-4-hydroxypiperidinium)ethylenediaminetetraacetate;
(n) tetra(1-hydroxy-2,2,6,6-tetramethyl-4-acetamidopiperidinium)ethylenediaminetetraacetate;
(o) tetra(1-hydroxy-2,2,6,6-tetramethyl-4-oxopiperidinium)ethylenediaminetetraacetate;
(p) penta(1-hydroxy-2,2,6,6-tetramethyl-4-hydroxypiperidinium)diethylenetriaminepentaacetate;
(q) penta(1-hydroxy-2,2,6,6-tetramethyl-4-acetamidopiperidinium)diethylenetriaminepentaacetate;
(r) penta(1-hydroxy-2,2,6,6-tetramethyl-4-oxopiperidinium)diethylenetriaminepentaacetate;
(s) tri(1-hydroxy-2,2,6,6-tetramethyl-4-hydroxypiperidinium)nitrilotriacetate;
(t) tri(1-hydroxy-2,2,6,6-tetramethyl-4-acetamidopiperidinium)nitrilotriacetate;
(u) tri(1-hydroxy-2,2,6,6-tetramethyl-4-oxopiperidinium)nitrilotriacetate;
(v) penta(1-hydroxy-2,2,6,6-tetramethyl-4-hydroxypiperidinium)diethylenetriaminepentamethylenephosphonate;
(w) penta(1-hydroxy-2,2,6,6-tetramethyl-4-acetamidopiperidinium)diethylenetriaminepentamethylenephosphonate;
(x) penta(1-hydroxy-2,2,6,6-tetramethyl-4-oxopiperidinium)diethylenetriaminepentamethylenephosphonate.

Some of the compounds of formulae (I) or (II) are commercially available, others can be prepared according to methods known in the art or in analogy to those methods. For example the hydroxylamine compounds of formula (II) can be prepared by reduction of the corresponding nitroxyl compound of the formula (I). The nitroxyl compound can be prepared by oxidising the corresponding amine with a hydroperoxide in the presence of a catalyst selected from the group consisting of the metal carbonyls, the metal oxides, the metal acetylacetonates and the metal alkoxides where the metal is selected from groups IVb, Vb, VIb, VIIb and VIII of the periodic table, at a temperature of 0° C. to 200° C. with the mole ratio of hydroperoxide to amine being 50:1 to 1:10 as disclosed in U.S. Pat. No. 4,665,185.

The compounds of formulae (I) or (II) are used either in the ink-jet recording material or in at least one ink-jet ink or in both.

The ink-jet ink according to this invention preferably contains 0.01 to 30% by weight, in particular 0.1 to 20% by weight, of at least one compound of formulae (I) or (II).

The ink-jet recording material according to this invention preferably contains 1 to 10000 mg/m$^2$, most preferably 50 to 2000 mg/m$^2$, of at least one compound of the formula (I) or (I).

Compounds (I) or (II) are preferably added to casting or coating dispersions which are applied by customary techniques to the support of the ink-jet recording material, or they can be absorbed onto the material from an aqueous or organic solution. If the recording material contains more than one layer, the compounds according to this invention can be added to one layer or can be distributed over a plurality of layers, wherein they can be applied to a plurality of layers in the same or different concentrations.

Compounds of formulae (I) or (II) are preferably used in ink-jet inks or recording materials, but may also be incorporated in ink compositions for felt-tipped pens, ink pads, fountain pens, and pen plotters, as well as for offset, book, flexographic and intaglio printing, and also for typewriter ribbons for dot matrix and calligraphic printing. Compounds of formulae (I) or (II) can further be used in silver halide photographic materials as well as in recording materials for pressure-sensitive copying systems, microcapsule photocopier systems, heat-sensitive copier systems, dye diffusion transfer printing, thermal wax transfer printing and dot matrix printing, and for use with electrostatic, electrographic, electrophoretic, magnetographic and laser-electrophotographic printers, recorders or plotters.

Amongst the printers used for ink-jet printing, a distinction is usually made between continuous and drop-on-demand printers. The ink-jet system according to this invention is suited for use with both type of printers.

The ink compositions according to the novel ink-jet system are preferably water-borne inks and may contain water-soluble solvents such as ethylene glycol, diethylene glycol, triethylene glycol or higher ethylene glycols, propylene glycol, 1,4-butanediol, or ethers of such glycols, thiodiglycol, glycerol and the ethers and esters thereof, polyglycerol, mono-, di- and triethanolamine, propanolamine, dimethyl formamide, dimethyl sulfoxide, dimethyl acetamide, N-methylpyrrolidone, 1,3-dimethylimidazolidone, methanol, ethanol, isopropanol, n-propanol, diacetone alcohol, acetone, methyl ethyl ketone or propylene carbonate.

The ink compositions according to the novel ink-jet system preferably contain water soluble dyes, such as those known for dyeing natural fibres. These can, for example, be acid dyes, direct dyes, reactive dyes, mono-, di- or polyazo dyes, triphenylmethane dyes, xanthene dyes or phtalocyanine dyes. Specific examples of such dyes are Food Black 2, Direct Black 19, Direct Black 38, Direct Black 168, SulphurBlack 1, Acid Red 14, Acid Red 35, Acid Red 52, Acid Red 249, Direct Red 227, Reactive Red 24, Reactive Red 40, Reactive Red 120, Reactive Red 159, Reactive Red 180, Acid Yellow 17, Acid Yellow 23, Direct Yellow 86, Direct Yellow 132, Acid blue 9, Acid Blue 185, Direct Blue 86, Direct Blue 199, copper phtalocyanines and the azo dyes listed in EP-A-366 221.

The ink compositions according to the invention may be nonaqueous and consist of a solution of dyes in an organic solvent or a mixture of organic solvents. Examples of solvents used for this purpose are alkyl carbitols, alkylcellosolves, dialkylformamides, dialkylacetamides, alcohols, acetone, methylethylketone, diethylketone, diethyl ketone, methyl isobutyl ketone, diisopropyl ketone, dibutyl ketone, dioxane, ethyl butyrate, ethyl isovalerate, diethyl malonate, diethyl succinate, butyl acetate, triethyl phosphate, ethylglycol acetate, toluene, xylene, tetralin or petroleum fractions. Example of solid waxes as solvents, which, as an ink carrier, must first be heated, are stearic or palmiric acid. Solvent based inks contain dyes soluble therein, for example Solvent Red, Solvent Yellow, Solvent Orange, Solvent Blue, Solvent Green, Solvent Violet, Solvent Brown or Solvent Black.

The ink compositions according to the novel ink-jet system may also contain minor amounts of conventional modifiers such as binders, surfactants, biocides, corrosion inhibitors, sequestrants, pH buffers or conductivity additives. They may also contain further light stabilisers or UV absorbers, including the compounds disclosed in U.S. Pat. No. 5,073,448, U.S. Pat. No. 5,089,050, U.S. Pat. No. 5,096,489, U.S. Pat. No. 5,124,723, U.S. Pat. No. 5,098,477 and U.S. Pat. No. 5,509,957.

The ink compositions according to the invention may also consist of more than one phase. Ink compositions that consist of an aqueous phase in which the dye is dissolved and a dispersed oil phase that contains an UV absorber and/or an antioxidant are for example disclosed in JP-A-0 1170 675, JP-A-0 1182 379, JP-A-0 1182 380, JP-A-01 182 381, JP-A-0 1193 376. Oil soluble dyes can be dissolved in an oil together with UV absorbers and/or antioxidants. The oil is either emulsified or dispersed in an aqueous phase as described, inter alia, in JP-A-0 1170 674 and JP-A-0 1170 672.

Further suited ink-jet ink compositions are described in EP-A-672 538, pages 3 to 6.

The recording materials according to the novel ink-jet system consist of a substrate having a surface which is printable by means of an ink-jet. The substrate is usually plain paper or polyolefine-laminated paper or a plastic sheet and is usually coated with at least one layer which is able to absorb ink. The substrate preferably has a thickness of 80 to 250 μm.

Uncoated paper might also be used. In this case, the paper acts simultaneously as substrate and ink absorbing layer. Materials made of cellulosic fibres and textile fibres materials such as cotton fabrics or blends of cotton and polyacrylamide or polyester, which might contain compounds of formula (I) or (II), can also be used as printing materials.

The recording materials may also be transparent, as in the case of overhead projection transparencies.

The compounds of formula (I) or (II) can be incorporated in the substrate during production thereof, conveniently by addition to the pulp during paper manufacture. Another method of application consists in spraying the substrate with a solution of the compound of formula (I) or (II) in water or in a readily volatile organic solvent. The use of emulsions or dispersions is also possible.

Usually, however, at least one coating composition with high dye affinity is coated onto the substrate and, in this case, the compounds of formula (I) or (II) are added to at least one of the said coating compositions. Typical coating compositions comprise, for example, a solid filler, a binder and conventional additives.

Example of suitable fillers are $SiO_2$, kaolin, talc, clay, calcium silicate, magnesium silicate, aluminium silicate, gypsum, zeolites, bentonite, diatomaceous earth, vermiculite, starch or the surface modified $SiO_2$ described in JP-A-60 260 377. Small amounts of white pigments, for example titanium dioxide, barytes, magnesium oxide, lime, chalk or magnesium carbonate, can be used with the filler in the coating composition, provided they do not significantly lower the print density of the ink-jet prints.

Coating compositions which are intended for transparent, projectable recording materials must not contain any light-scattering particles, such as pigments and fillers.

The binder binds the fillers to one another and to the substrate. Typical conventional binders are water-soluble polymers such as polyvinyl alcohol, partially hydrolysed polyvinyl acetate, cellulose and cellulose derivatives such as hydroxyethyl cellulose, polyvinyl pyrrolidone and copolymers thereof, polyethylene oxide, salts of polyacrylic acid, sodium alginate, starch and starch derivatives, Na alginate, polyethylene imine, polyvinylpyridinium halide, gelatines and gelatine derivatives such as phthaloyl gelatines, casein, vegetable gum, dextrin, albumin, dispersions and polyacrylates or acrylate/methacrylate copolymers, lattices of natural or synthetic rubber, poly(meth)acrylamide, polyvinyl ethers, polyvinyl esters, copolymers of maleic acid, melamine resins, urea resins, water soluble polyurethanes and polyesters, or the chemically modified polyvinyl alcohols disclosed in JP-A-61 134 290 or JP-A-61 134 291.

An additional dye receptor or a mordant which enhances the fixation of the dye to the coating may be added to the binder. Dye receptors for acid dyes are cationic or amphoteric. The cationic mordants can be soluble or dispersible in water. Exemplary cationic mordants are polymeric ammonium compounds such as polyvinylbenzyldi- or trialkylammonium compounds, optionally quaternised poly(di)allylammonium compounds, polymethacryloxyethyldimethylhydroxyethylammonium chloride, polyvinylbenzylmethylimidazolium chloride, polyvinylbenzylpicolinium chloride or polyvinylbenzyltributylammonium chloride. Further examples are basic polymers such as poly(dimethylaminoethyl)methacrylate, polyalkylenepolyamines and their condensation products with dicyanodiamide, amine/epichlorohydrin polycondensates or the compounds disclosed in JP-A-57-36692, 57-64591, 57-187289, 57-191084, 58-177390, 58-208357, 59-20696, 59-33176, 59-96987, 59-198188, 6049990, 60-71 796, 60-72785, 60-161188, 60-187 582, 60-189481, 60-189482, 61-14979, 61-43593, 61-57379, 61-57380, 61-58788, 61-61887, 61-63477, 61-72581, 61-95977, 61-134291 or in U.S. Pat. Nos. 4,547,405 and 4,554,181 as well as in DE-A-3417582 and EP-B-609 930. The mordants used can also be compounds containing phosphonium groups (EP-B-609 930) as well as ground cationic ion exchange resins which are introduced in the mordant layer in a finely divided form. Further suitable cationic mordants are described in U.S. Pat. No. 6,102,997, pages 12 to 17. The cationic mordants can be soluble or dispersible in water and have an average molecular weight (weight average) of preferably at least 2,000 and, in particular, at least 20,000.

The ink jet recording media of the present invention may for example, comprise receptive layers as described in U.S. Pat. Nos. 5,102,717; 5,523,149; 5,605,750; 5,624,482; 5,691,046; 5,683,784; 5,928,127; 5,912,071; 6,025,068 and 6,114,022, the relevant disclosures of which are hereby incorporated by reference.

Besides the dye acceptor layer(s), the ink-jet recording material might comprise other layers on the ink receiving side, which are intended, for example, for providing scratch resistance, absorbing water or controlling whiteness and/or glossiness. The backside of the substrate might also be coated with at least one binder layer, in order to prevent buckling of the recording material.

The ink-jet recording material might also contain a number of other additives such as antioxidants, further light stabilisers (also including UV absorbers), viscosity improvers, fluorescent whitening agents, biocides, wetting agents, emulsifiers and spacers.

Suitable spacers are in particular spherical, have an average diameter of 1 to 50 μm, and in particular 5 to 20 μm, and have a narrow particle size distribution. Suitable spacers consist, for example, of polymethylmethacrylate, polystyrene, polyvinyl toluene, silicon dioxide and insoluble starch.

Illustrative examples of particularly suitable antioxidants are sterically hindered phenols, hydroquinones and hydroquinone ethers, for example the antioxidants disclosed in GB-A-2 088 777 or JP-A-60-72785, JP-A-0-72786 and JP-A-60-71796.

Illustrative examples of particularly suitable light stabilisers are organic nickel compounds and sterically hindered amines, for example the light stabilisers disclosed in JP-A-58-152072, 61-146591, 61-163886, 60-72785 and 61-146591 or in EP 373 573, 685 345 and 704 316, GB-A-2 088 777, JP-A-59-169883 and 61-177279.

Suitable UV absorbers are disclosed, inter alia, in Research Disclosure No. 24239 (1984) page 284, 37254 part VII (1995) page 292, 37038 part X (1995) page 85 and 38957 part VI (1996), GB-A-2 088 777, EP 280 650, EP 306 083 and EP 711 804. These compounds are preferably introduced into the layer(s) farthest from the support. In a particular embodiment, the UV absorbers are contained in a layer above the layer(s) containing the compounds of the formulae (I) or (II). Suitable UV absorbers for concurrent use with a compound of formula (I) or (II) in recording materials for ink-jet printing are in particular those of the 2'-hydroxyphenylbenzotriazole and 2'-hydroxyphenyltriazine class and, most particularly, 2-(2'-hydroxy-3',5'-di-tert-amylphenyl)benzotriazole and 2-(2'-hydroxy-3'-tert-butyl-5'-polyglycolpropionate-phenyl)benzotriazole. Further examples of particularly suited UV absorbers are listed in U.S. Pat. No. 6,102,997 pages 18–19. The UV absorbers can be soluble or insoluble in water and added to the coating composition as dispersion or emulsion, optionally together with high-boiling solvents, using suitable dispersing agents or emulsifiers. Suitable high boiling solvents are described in Research Disclosure No. 37254 part VIII (1995) page 292.

The binders in the individual layers, and in particular gelatines, can also be crosslinked by suitable compounds, so-called hardening agents, in order to improve the water and scratch resistance of the layers. Suitable hardening agents are described in Research Disclosure No. 37254 part IX (1995) page 294, 37038 part XII (1995) page 86 and 38957 part IIB (1996) page 599 et seq. The hardening agents are normally used in quantities of 0.005 to 10% by weight, and preferably 0.01 to 1% by weight, based on the binder to be hardened.

The ink-jet recording material can be produced in one pass from the support material and a casting solution for each layer to be applied, by means of a cascade or curtain casting device of the kind known from the production of photographic silver halide materials. After the casting solution(s) has/have been cast on the support, the material is dried and is then ready for use. The individual layers have a dry layer thickness of 0.1 to 20 μm, and preferably 0.5 to 5 μm.

Compounds of formulae (I) or (II) can be dissolved either directly in the ink or coating composition or added thereto in the form of an emulsion or suspension. As already mentioned, the compounds of formulae (I) or (II) can be also applied to the recording material in a separate operation, alone or together with other already described components, as a solution in water or in a suitable organic solvent. Application can be made by spraying, by sizing in a sizing press, by a separate coating operation or by immersion in a vat. After subjecting the recording material to such an aftertreatment, an additional drying step is necessary.

The invention is illustrated by the following non-limitative examples.

EXAMPLE 1

An ink-jet ink is prepared by dissolving 2 g of dye in 20 g of diethylene glycol and 78 g of deionized water. The dye used is Acid red 52. The stabiliser is weighed in an amount of 0.15 g into a test tube and dissolved in 2.85 g of ink. The obtained ink is filtered through a filter having a pore size of 0.45 μm and transferred into an emptied and carefully cleaned cartridge of a Deskjet 510 printer (Hewlett-Packard). A stepped image is then printed onto plain paper (sihl+eika). The produced print is left to dry at 50° C. under vacuum for two hours and thereafter irradiated behind a 5 mm thick window glass in an Atlas Ci-35 light fading device equipped with a Xenon lamp. The Atlas device is operated at 43° C., 50% RH without dark cycles and the light intensity is 461 W/m$^2$ (300–800 nm). The colour density of each step is measured before and after exposure using a MacBeth TR 924 densitometer.

The results are summarised in the table below, for an initial density of 1. Lower density loss values indicate higher light fastness.

| Sample | Stabiliser | Density loss (%) after 7.5 kJ · cm$^{-2}$ |
| --- | --- | --- |
| 1-1 | none | 42 |
| 1-2 | Cpd 1 | 23 |
| 1-3 | Cpd 2 | 16 |
| 1-4 | Cpd 3 | 22 |

As above table shows, compounds according to this invention are able to improve substantially the light fastness of the ink-jet print.

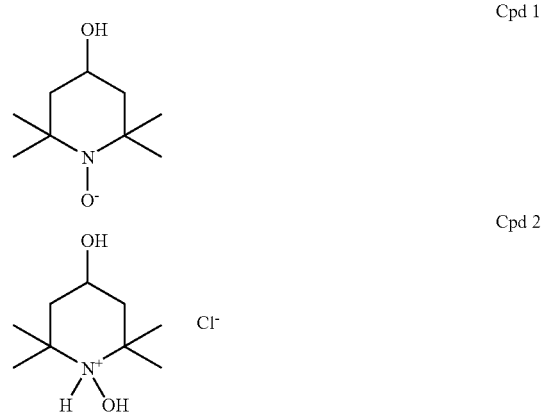

-continued

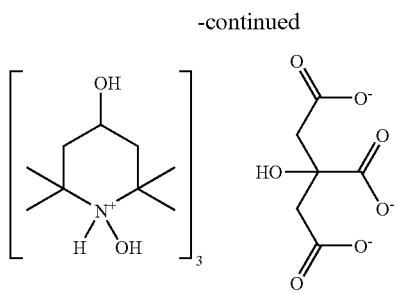

Cpd 3

EXAMPLE 2

Magenta and Yellow inks are extracted from an Hewlett-Packard three-colour cartridge (HP C1823D). The stabiliser is weighed in an amount of 0.15 g into a test tube and dissolved in 2.85 g of either the magenta or yellow ink. The obtained ink is filtered through a filter having a pore size of 0.45 μm and transferred into an emptied and carefully cleaned cartridge of a Deskjet 510 printer (Hewlett-Packard). A stepped image is then printed onto plain paper (sihl+eika) or, alternatively, onto Premium Photo paper from Hewlett-Packard (item code C6040A). The produced print is left to dry at 50° C. under vacuum for two hours and thereafter irradiated behind a 5 mm thick window glass in an Atlas Ci-35 light fading device equipped with a Xenon lamp. The Atlas device is operated at 43° C., 50% RH without dark cycles and the light intensity is 461 W/m² (300–800 nm). The colour density of each step is measured before and after exposure using a MacBeth TR 924 densitometer. The results are summarised in the table below, for an initial density of 1. Lower density loss values indicate higher light fastness.

| | | Density loss (%) after 30 kJ · cm⁻² | | |
|---|---|---|---|---|
| | | Magenta print | | |
| Sample | Stabiliser | on plain paper | on HP Premium paper | Yellow print on plain paper |
| 3-1 | none | 41 | 19 | 24 |
| 3-2 | Cpd 1 | 33 | 9 | 20 |
| 3-3 | Cpd 2 | 31 | 5 | 20 |

As above table shows, compounds according to this invention are able to improve clearly the light fastness of the magenta and yellow prints.

EXAMPLE 3

The stabiliser is weighed in an amount of 0.15 g into a test tube and dissolved in 2.85 g of either the magenta or the yellow ink of an Encad GX ink set (item code 210647). The obtained ink is filtered through a filter having a pore size of 0.45 μm and transferred into an emptied and carefully cleaned cartridge of a Deskjet 510 printer (Hewlett-Packard). A stepped image is then printed onto plain paper (sihl+eika) or, alternatively, onto Premium Photo paper from Hewlett-Packard (item code C6040A). The produced print is left to dry at 50° C. under vacuum for two hours and thereafter irradiated behind a 5 mm thick window glass in an Atlas Ci-35 light fading device equipped with a Xenon lamp. The Atlas device is operated at 43° C., 50% RH without dark cycles and the light intensity is 461 W/m² (300–800 nm). The colour density of each step as well as the CIEL*a*b* chromaticity coordinates of the step with highest density are measured before and after exposure using MacBeth TR 924 and Datacolor Elrepho 2000 densitometers, respectively.

The results are summarised in the tables below, for an initial density of 1. Lower density loss or ΔE values indicate higher light fastness.

| | | Density loss (%) after 30 kJ · cm⁻² | | |
|---|---|---|---|---|
| | | Magenta print | | |
| Sample | Stabiliser | on plain paper | on HP Premium paper | Yellow print on plain paper |
| 3-1 | none | 17 | 55 | 12 |
| 3-2 | Cpd 1 | 9 | 15 | 5 |
| 3-3 | Cpd 2 | 12 | — | 6 |

| | | ΔE [1] after 30 kJ · cm⁻² | | |
|---|---|---|---|---|
| | | Magenta print | | |
| Sampl | Stabiliser | on plain paper | on HP Premium paper | Yellow print on plain paper |
| 3-1 | none | 11 | 22 | 8 |
| 3-2 | Cpd 1 | 6 | 6 | 4 |
| 3-3 | Cpd 2 | 8 | — | 7 |

[1] $\Delta E = [(\Delta L^*)^2 + (\Delta a^*)^2 + (\Delta b^*)^2]^{1/2}$

As above tables show, compounds according to this invention are able to improve clearly the light fastness of the magenta and yellow prints.

EXAMPLE 4

Sample 4-1: a recording material for ink-jet printing is produced by coating a layer with the following composition on polyethylene-laminated paper (all amounts in g.m⁻²):

| | |
|---|---|
| Gelatine | 4.060 |
| Mordant (Alcostat 167 from Ciba Specialty Chemicals) | 0.225 |
| Surfactant (Triton X-100 from Union Carbide Chemicals) | 0.050 |

Sample 4-2 is produced as sample 4-1, except that 1.0 g.m⁻² of invention compound 1 is added, in emulsified form (high boiling solvent=tricresylphosphate 0.625 g.m⁻², surfactant=Triton X-100), in the layer Sample 4-3 is produced as sample 4-1, except that 0.3 g.m⁻² of invention compound 3 is added to the layer.

After drying, all samples are printed with magenta and yellow stepped images using a Deskjet 970Cxi printer from Hewlett-Packard. The produced prints are left to dry at 50° C. under vacuum for two hours and thereafter irradiated behind a 5 mm thick window glass in an Atlas Ci-35 light fading device equipped with a Xenon lamp. The Atlas device is operated at 43° C., 50% RH without dark cycles and the light intensity is 461 W/m² (300–800 nm). For every print, the colour density of each step is measured before and after exposure using a MacBeth TR 924 densitometer.

The results are summarised in the tables below, for an initial density of 1. Lower density loss values indicate higher light fastness.

| Sample | Stabiliser | Dye loss (%) after 7.5 kJ·cm⁻² | |
|---|---|---|---|
| | | Magenta print | Yellow print |
| 4-1 | none | 28 | 18 |
| 4-2 | Cpd 1 | 13 | 12 |
| 4-3 | Cpd 3 | 6 | 17 |

As above tables show, compounds according to this invention prove quite effective in improving the light fastness of Deskjet 970Cxi prints.

What is claimed is:

1. An ink-jet ink or an ink-jet system containing at least one water-soluble hindered amine compound of formula (II) wherein the compounds of formulae (II) are selected from the compounds of formulae A* to DD*:

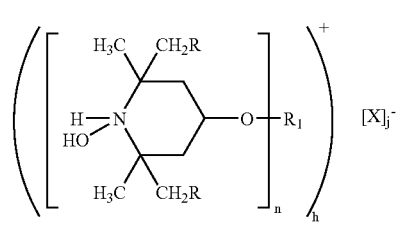
(A*)

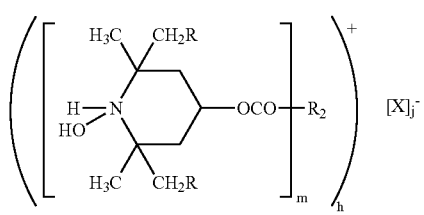
(B*)

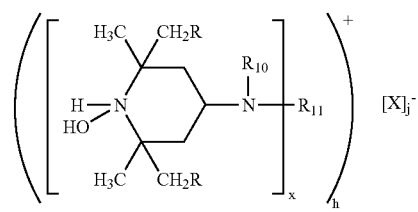
(C*)

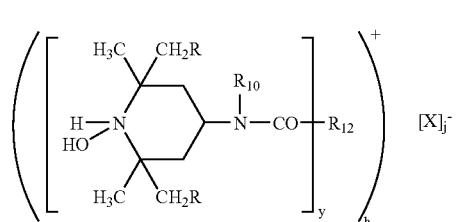
(D*)

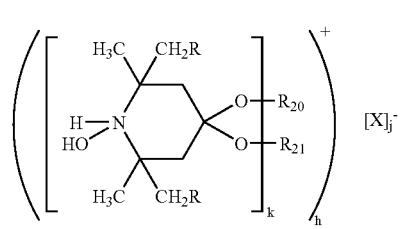
(E*)

-continued

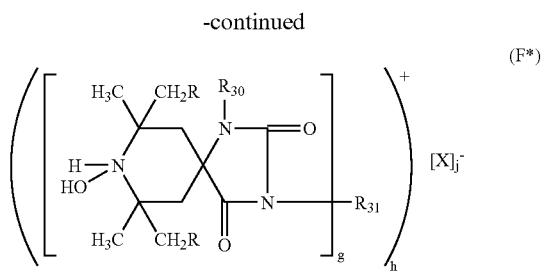
(F*)

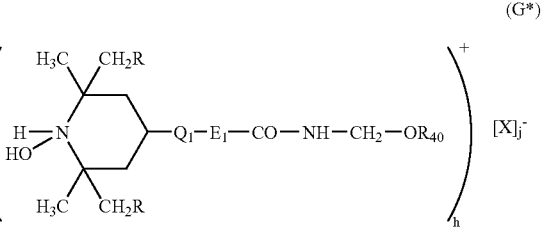
(G*)

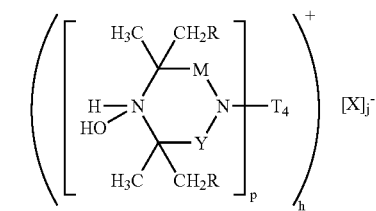
(H*)

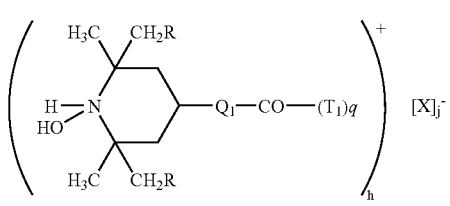
(I*)

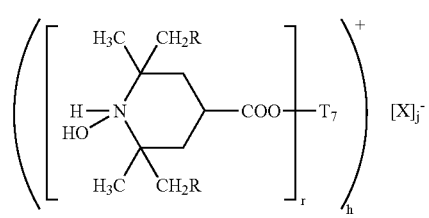
(J*)

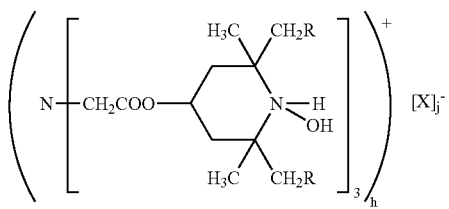
(K*)

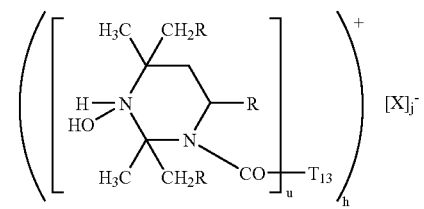
(L*)

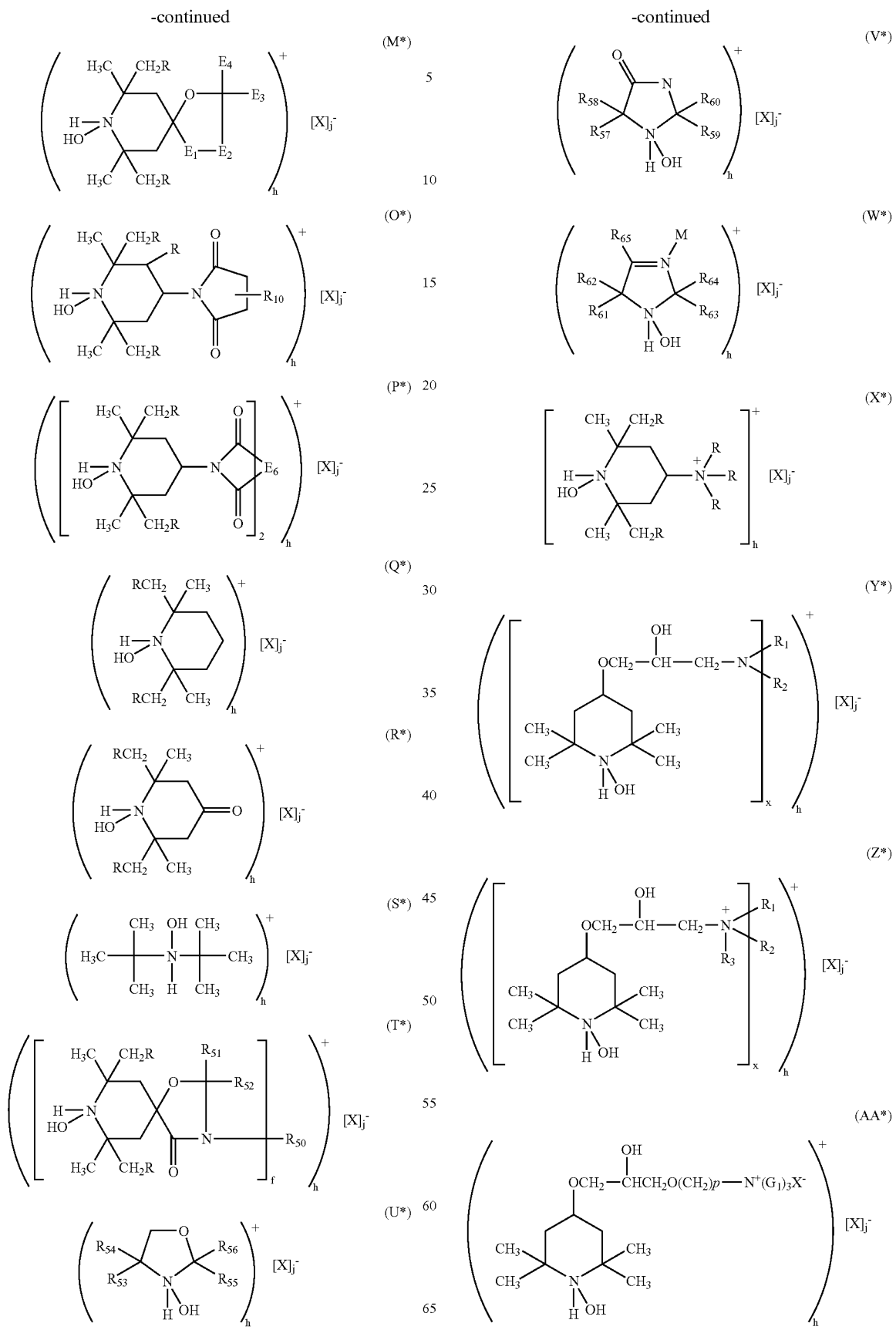

-continued

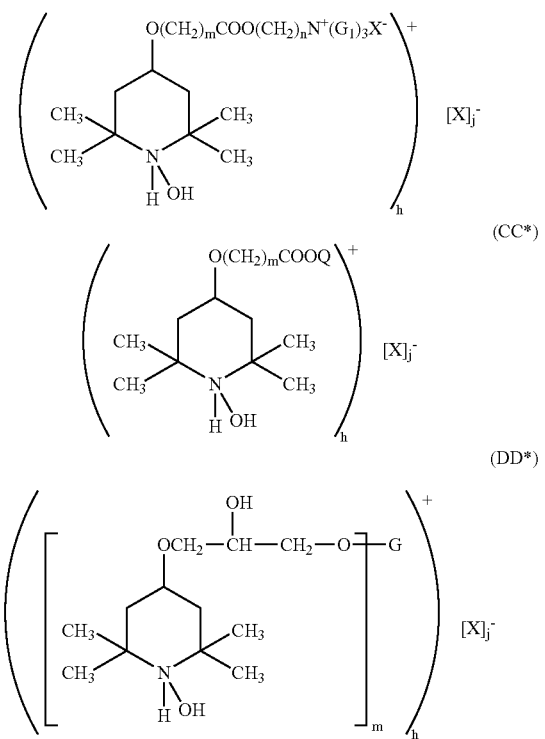

(BB*)

(CC*)

(DD*)

wherein
R is hydrogen or methyl; and
in formula A* n is 1 or 2, and
when n is 1,
$R_1$ is hydrogen, alkyl of 1 to 18 carbon atoms, alkenyl of 2–18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
$R_1$ is alkyl of 1 to 4 carbon atoms substituted by a carboxy group or by —COOZ where Z is hydrogen, alkyl of 1 to 4 carbon atoms or phenyl, or where Z is said alkyl substituted by —(COO$^-$)$_n$M$^{n+}$ where n is 1–3 and M is a metal ion from the 1st, 2nd or 3rd group of the periodic table or is Zn, Cu, Ni or Co, or M is a group N$^{n+}$(R$_2$)$_4$ where $R_2$ is alkyl of 1 to 8 carbon atoms or benzyl,
when n is 2,
$R_1$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups;
in formula B* m is 1 to 4, and
when m is 1,
$R_2$ is alkyl of 1 to 18 carbon atoms, alkyl of 3 to 18 carbon atoms interrupted by —COO—, alkyl of 3 to 18 carbon atoms substituted by COOH or COO—, or $R_2$ is —CH$_2$(OCH$_2$CH$_2$)$_n$OCH$_3$ where n is 1 to 12, or
$R_2$ is cycloalkyl of 5 to 12 carbon atoms, aryl of 6 to 12 carbon atoms, or said aryl substituted by one to four alkyl groups of 1 to 4 carbon atoms, or $R_2$ is —NHR$_3$ where $R_3$ is alkyl of 1 to 18 carbon atoms, cycloalkyl of 5 to 12 carbon atoms, aryl of 6 to 12 carbon atoms, or said aryl substituted by one to four alkyl of 1 to 4 carbon atoms, or
$R_2$ is —N(R$_3$)$_2$ where $R_3$ is as defined above,
when m is 2,
$R_2$ is alkylene of 1 to 12 carbon atoms, alkenylene of 4 to 12 carbon atoms, xylylene, alkylene of 2 to 12 carbon atoms interrupted by —COO—, alkylene of 3 to 18 carbon atoms substituted by COOH or COO—, or $R_2$ is —CH$_2$(OCH$_2$CH$_2$)$_n$OCH$_2$— where n is 1 to 12, or
$R_2$ is cycloalkylene of 5 to 12 carbon atoms, aralkylene of 7 to 15 carbon atoms or arylene of 6 to 12 carbon atoms, or
$R_2$ is —NHR$_4$NH— where $R_4$ is alkylene of 2 to 18 carbon atoms, cycloalkylene of 5 to 12 carbon atoms, aralkylene of 8 to 15 carbon atoms or arylene of 6 to 12 carbon atoms, or
$R_2$ is —N(R$_3$)R$_4$N(R$_3$)— where $R_3$ and $R_4$ are as defined above, or
$R_2$ is —CO— or —NH—CO—NH—,
when m is 3,
$R_2$ is alkanetriyl of 3 to 8 carbon atoms or benzenetriyl, or
when m is 4,
$R_2$ is alkanetetrayl of 5 to 8 carbon atoms or benzenetetrayl,
in formula C*,
$R_{10}$ is hydrogen, alkyl of 1 to 18 carbon atoms, cycloalkyl of 5 to 12 carbon atoms, aralkyl of 7 to 15 carbon atoms, alkanoyl of 2 to 18 carbon atoms, alkenoyl of 3 to 5 carbon atoms or benzoyl,
x is 1 or 2, and
when x is 1,
$R_{11}$ is hydrogen, alkyl of 1 to 18 carbon atoms, alkenyl of 2 to 18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
$R_{11}$ is alkyl of 1 to 4 carbon atoms substituted by a carboxy group or by —COOZ where Z is hydrogen, alkyl of 1 to 4 carbon atoms or phenyl, or where Z is said alkyl substituted by —(COO$^-$)$_n$M$^{n+}$ where n is 1–3 and M is a metal ion from the 1st, 2nd or 3rd group of the periodic table or is Zn, Cu, Ni or Co, or M is a group N$^{n+}$(R$_2$)$_4$ where $R_2$ is hydrogen, alkyl of 1 to 8 carbon atoms or benzyl, or
when x is 2,
$R_{11}$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups,
in formula D* y is 1 to 4,
$R_{10}$ is as defined above,
and $R_{12}$ is defined as $R_2$ above,
in formula E* k is 1 or 2,
when k is 1,
$R_{20}$ and $R_{21}$ are independently alkyl of 1 to 12 carbon atoms, alkenyl of 2 to 12 carbon atoms or aralkyl of 7 to 15 carbon atoms, or $R_{20}$ is also hydrogen, or
$R_{20}$ and $R_{21}$ together are alkylene of 2 to 8 carbon atoms or said alkylene substituted by hydroxyl, or are acyloxy-alkylene of 4 to 22 carbon atoms, or
when k is 2,
$R_{20}$ and $R_{21}$ are together (—CH$_2$)$_2$C(CH$_2$—)$_2$, in formula F*, $R_{30}$ is hydrogen, alkyl of 1 to 18 carbon atoms, benzyl, glycidyl, or alkoxyalkyl of 2 to 6 carbon atoms, g is 1 or 2, when g is 1, $R_{31}$ is defined as $R_1$ above when n is 1, when g is 2, $R_{31}$ is defined as $R_1$ above when n is 2, in formula G*, $Q_1$ is —$NR_{41}$— or —O—, $E_1$ is alkylene of 1 to 3 carbon atoms, or $E_1$ is —$CH_2$—$CH(R_{42})$—O— where $R_{42}$ is hydrogen, methyl or phenyl, or $E_1$ is —$(CH_2)_3$—NH— or $E_1$ is a direct bond, $R_{40}$ is hydrogen or alkyl of 1 to 18 carbon atoms, $R_{41}$ is hydrogen, alkyl of 1 to 18 carbon atoms, cycloalkyl of 5 to 12 carbon atoms, aralkyl of 7 to 15 carbon atoms, aryl of 6 to 10 carbon atoms, or $R_{41}$ is —$CH_2$—$CH(R_{42})$—OH where $R_{42}$ is as defined above, in formula H* p is 1 or 2, $T_4$ is as defined for $R_{11}$ when x is 1 or 2, M and Y are independently methylene or carbonyl;

in formula I*, this formula denotes a recurring structural unit of a polymer where $T_1$ is ethylene or 1,2-propylene or is the repeating structural unit derived from an alpha-olefin copolymer with an alkyl acrylate or methacrylate, and where q is 2 to 100, $Q_1$ is —$N(R_{41})$— or —O— where $R_{41}$ is as defined above, in formula J*, r is 1 or 2, $T_7$ is as defined for $R_1$ when n is 1 or 2 in formula A*, in formula L* u is 1 or 2, $T_{13}$ is as defined for $R_1$ when n is 1 or 2 in formula A*, with the proviso that $T_{13}$ is not hydrogen when u is 1, in formula M*, $E_1$ and $E_2$, being different, each are —CO— or —$N(E_5)$— where $E_5$ is hydrogen, alkyl of 1 to 12 carbon atoms or alkoxycarbonylalkyl of 4 to 22 carbon atoms, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by one to four alkyl of 1 to 4 carbon atoms, in formula O*, $R_{10}$ is as defined for $R_{10}$ in formula C*, in formula P*, $E_6$ is an aliphatic or aromatic tetravalent radical, in formula T*, $R_{51}$ is hydrogen, alkyl of 1 to 18 carbon atoms, cycloalkyl of 5 to 12 carbon atoms, or aryl of 6 to 10 carbon atoms, $R_{52}$ is hydrogen or alkyl of 1 to 18 carbon atoms, or $R_{51}$ and $R_{52}$ together of alkylene of 4 to 8 carbon atoms, f is 1 or 2, when f is 1, $R_{50}$ is as defined for $R_{11}$ in formula C* when x is 1, or $R_{50}$ is —$(CH_2)_z COOR_{54}$ where z is 1 to 4 and $R_{54}$ is hydrogen or alkyl of 1 to 18 carbon atoms, or $R_{54}$ is a metal ion from the 1st, 2nd or 3rd group of the periodic table or a group —$N(R_{55})_4$ where $R_{55}$ is hydrogen, alkyl of 1 to 12 carbon atoms or benzyl, when f is 2, $R_{50}$ is as defined for $R_{11}$ in formula C* when x is 2, in formula U*, $R_{53}$, $R_{54}$, $R_{55}$ and $R_{56}$ are independently alkyl of 1 to 4 carbon atoms or are together pentamethylene, in formula V*, $R_{57}$, $R_{58}$, $R_{59}$ and $R_{60}$ are independently alkyl of 1 to 4 carbon atoms or are together pentamethylene, in formula W*, $R_{61}$, $R_{62}$, $R_{63}$ and $R_{64}$ are independently alkyl of 1 to 4 carbon atoms or are together pentamethylene, $R_{65}$ is alkyl of 1 to 5 carbon atoms, M is hydrogen or oxygen, wherein in formulas X* to CC* n is 2 to 3, $G_1$ is hydrogen, methyl, ethyl, butyl or benzyl, m is 1 to 4, x is 1 to 4, when x is 1, $R_1$ and $R_2$ are independently alkyl of 1 to 18 carbon atoms, said alkyl interrupted by one to five oxygen atoms, said alkyl substituted by 1 to 5 hydroxyl groups or said alkyl both interrupted by said oxygen atoms and substituted by said hydroxyl groups; cycloalkyl of 5 to 12 carbon atoms, aralkyl of 7 to 15 carbon atoms, aryl of 6 to 10 carbon atoms or said aryl substituted by one to three alkyl of 1 to 8 carbon atoms, or $R_1$ is also hydrogen, or $R_1$ and $R_2$ are together tetramethylene, pentamethylene, hexamethylene or 3-oxapentamethylene, when x is 2, $R_1$ is hydrogen, alkyl of 1 to 8 carbon atoms, said alkyl interrupted by one or two oxygen atoms, said alkyl substituted by a hydroxyl group, or said alkyl both interrupted by one or two oxygen atoms and substituted by a hydroxyl group, $R_2$ is alkylene of 2 to 18 carbon atoms, said alkylene interrupted by one to five oxygen atoms, said alkylene substituted by 1 to 5 hydroxyl groups or said alkylene both interrupted by said oxygen atoms and substituted by said hydroxyl groups; o-, m- or p-phenylene or said phenylene substituted by one or two alkyl of 1 to 4 carbon atoms, or $R_2$ is —$(CH_2)_k O[(CH_2)_k O]_h (CH_2)_k$— where k is 2 to 4 and h is 1 to 40, or $R_1$ and $R_2$ together with the two N atoms to which they are attached are piperazin-1,4-diyl, when x is 3, $R_1$ is hydrogen, $R_2$ is alkylene of 4 to 8 carbon atoms interrupted by one nitrogen atom, when x is 4, $R_1$ is hydrogen, $R_2$ is alkylene of 6 to 12 carbon atoms interrupted by two nitrogen atoms, $R_3$ is hydrogen, alkyl of 1 to 8 carbon atoms, said alkyl interrupted by one or two oxygen atoms, said alkyl substituted by a hydroxyl group, or both interrupted by one or two oxygen atoms and substituted by a hydroxyl group, p is 2 or 3, and Q is an alkali metal salt, ammonium or $N^+(G_1)_4$, and in formula DD* m is 2 or 3, when m is 2,

G is —$(CH_2 CHR—O)_r CH_2 CHR$—, where r is 0 to 3, and R is hydrogen or methyl, and when m is 3, G is glyceryl, and X is an inorganic or organic anion selected from the group consisting of phosphate, phosphonate, carbonate, bicarbonate, nitrate, chloride, bromide, bisulfite, sulfite, bisulfate, sulfate, borate, formate, acetate, benzoate, citrate, oxalate, tartrate, acrylate, polyacrylate, fumarate, maleate, itaconate, glycolate, gluconate, malate, mandelate, tiglate, ascorbate, polymethacrylate, a carboxylate of nitrilotriacetic acid, hydroxyethylethylenediaminetriacetic acid, ethylenediaminetetraacetic acid or of diethylenetriaminepentaacetic acid, a diethylenetriaminepentamethylenephosphonate, an alkylsulfonate and an arylsulfonate, and where the total charge of cations h is equal to the total charge of anions j.

2. An ink-jet ink according to claim 1.

3. An ink-jet system according to claim 1.

4. An ink-jet ink or an ink-jet system according to claim 1, wherein X in formula (II) is chloride, bisulfate, sulfate, phosphate, nitrate, ascorbate, formate, acetate, benzoate, oxalate, citrate, a carboxylate of ethylenediaminetetraacetic acid or of diethylenetriaminepentaacetic acid or polyacrylate.

5. An ink-jet ink or an ink-jet system according to claim 1, wherein in formula (II) h and j are in the range from 1–5.

6. An ink-jet ink or an ink-jet system according to claim 1, wherein the compounds of general formulae (II) are those of formulae A*, B*, C*, D*, Q*, R*, S*, X*, Y* and Z*, wherein R is hydrogen,
in formula A* n is 1 or 2,
when n is 1,
$R_1$ is hydrogen, alkyl of 1 to 6 carbon atoms, alkenyl of 2–6 carbon atoms, propargyl, glycidyl, alkyl of 2 to 20 carbon atoms interrupted by one to ten oxygen atoms, said alkyl substituted by one to five hydroxyl groups or both interrupted by said oxygen atoms and substituted by said hydroxyl groups, or
R is alkyl of 1 to 4 carbon atoms substituted by a carboxy group or by —COOZ where Z is hydrogen or alkyl of 1 to 4 carbon atoms,
when n is 2,
$R_1$ is alkylene of 1 to 8 carbon atoms, alkenylene of 4 to 8 carbon atoms, alkylene of 1 to 20 carbon atoms interrupted by one to ten oxygen atoms, substituted by one to five hydroxyl groups or both interrupted by said oxygen atoms and substituted by said hydroxyl groups,
in formula B* m is 1 or 2
when m is 1,
$R_2$ is alkyl of 1 to 4 carbon atoms or $R_2$ is $CH_2(OCH_2CH_2)_nOCH_3$ where n is 1 to 12, or
$R_2$ is phenyl, or said phenyl substituted by one to three methyl groups, or
$R_2$ is —$NHR_3$ where $R_3$ is alkyl of 1 to 4 carbon atoms or phenyl, or said phenyl substituted by one or two methyl groups,
when m is 2,
$R_2$ is alkylene of 1 to 8 carbon atoms, alkenylene of 4 to 8 carbon atoms, or $R_2$ is —$CH_2(OCH_2CH_2)_nOCH_2$— where n is 1 to 12, or
$R_2$ is $NHR_4NH$ where $R_4$ is of 2 to 6 carbon atoms, aralkylene of 8 to 15 carbon atoms or arylene of 6 to 12 carbon atoms, or
$R_2$ is —CO— or —NHCONH,
in formula C*,
$R_{10}$ is hydrogen or, alkanoyl of 1 to 3 carbon atoms,
x is 1 or 2,
when x is 1,
$R_{11}$ is hydrogen, alkyl of 1 to 6 carbon atoms or glycidyl, or
$R_{11}$ is alkyl of 1 to 4 carbon atoms substituted by a carboxy group or by COOZ where Z is hydrogen or alkyl of 1 to 4 carbon atoms,
when x is 2,
$R_{11}$ is alkylene of 1 to 6 carbon atoms,
in formula D*,
$R_{10}$ is hydrogen,
y is 1 or 2,
$R_{12}$ is defined as $R_2$ above,
in formula Y* and Z*,
x is 1 or 2,
when x is 1,
$R_1$ and $R_2$ are independently alkyl of 1 to 4 carbon atoms or $R_1$ and $R_2$ are together tetramethylene, or pentamethylene,
$R_2$ is hydrogen or alkyl of 1 to 4 carbon atoms, said alkyl group substituted by a hydroxyl group,
when x is 2,
$R_1$ is hydrogen, alkyl of 1 to 4 carbon atoms, said alkyl substituted by a hydroxyl group,
$R_2$ is alkylene of 2 to 6 carbon atoms,
$R_3$ is as defined above.

7. An ink-jet ink or an ink-jet system according to claim 1, wherein the compounds of formula (II) are those of formulae A*, B*, C*, D*, Q* and R*,
wherein
R is hydrogen,
in formula A*,
h is 1,
$R_1$ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or
$R_1$ is alkyl of 1 to 4 carbon atoms substituted by —COOZ where Z is hydrogen or alkyl of 1 to 4 carbon atoms,
in formula B*,
m is 1 or 2,
$R_2$ is alkyl of 1 to 4 carbon atoms or $R_2$ is $CH_2(OCH_2CH_2)_nOCH_3$ where n is 1 to 4,
when m is 2,
$R_2$ is alkylene of 1 to 8 carbon atoms,
in formula C*,
$R_{10}$ is hydrogen or alkanoyl of 1 or 2 carbon atoms,
x is 1 or 2,
when x is 1,
$R_{11}$ is hydrogen, alkyl of 1 to 4 carbon atoms or glycidyl,
$R_{11}$ is alkyl of 1 to 4 carbon atoms substituted by COOZ where Z is hydrogen or alkyl of 1 to 4 carbon atoms,
when x is 2,
$R_{11}$ is alkylene of 1 to 6 carbon atoms,
in formula D*,
$R_{10}$ is hydrogen,
y is 1 or 2,
$R_{12}$ is defined as $R_2$ above.

8. An ink-jet ink or an ink-jet system according to claim 1, wherein the compound of formula (II) is selected from the group consisting of
(b) 1-hydroxy-2,2-6-6-tetramethyl-4-acetoxypiperidinium citrate;
(d) 1-hydroxy-2,2,6,6-tetramethyl-4-acetamidopiperidinium bisulfate;
(f) 1-hydroxy -2,2,6,6-tetramethyl-4-oxo-piperidinium acetate;
(h) 1-hydroxy-2,2,6,6-tetramethyl-4-methoxy-piperidinium acetate;

(k) 1-hydroxy-2,2,6,6-tetramethyl-4-propoxy-piperidinium acetate;
(m) 1-hydroxy-2,2,6,6-tetramethyl-4-(2-hydroxy-4-oxapentoxy)piperidinium acetate;
(o) 1-hydroxy-2,2,6,6-tetramethyl-4-hydroxypiperidinium chloride;
(p) 1-hydroxy-2,2,6,6-tetramethyl-4-hydroxypiperidinium acetate;
(q) 1-hydroxy-2,2,6,6-tetramethyl-4-hydroxypiperidinium bisulfate;
(r) 1-hydroxy-2,2,6,6-tetramethyl-4-hydroxypiperidinium citrate;
(s) bis(1-hydroxy-2,2,6,6-tetramethyl-4-hydroxypiperidinium)citrate;
(t) tris(1-hydroxy-2,2,6,6-tetramethyl-4-hydroxypiperidinium)citrate;
(u) tetra(1-hydroxy-2,2,6,6-tetramethyl-4-hydroxypiperidinium)ethylenediaminetetraacetate;
(v) tetra(1-hydroxy-2,2,6,6-tetramethyl-4-acetamidopiperidinium)ethylenediaminetetraacetate;
(w) tetra(1-hydroxy-2,2,6,6-tetramethyl-4-oxopiperidinium)ethylenediaminetetraacetate;
(x) penta(1-hydroxy-2,2,6,6-tetramethyl-4-hydroxypiperidinium)diethylenetriaminepentaacetate;
(z) penta(1-hydroxy-2,2,6,6-tetramethyl-4-oxopiperidinium)diethylenetriaminepentaacetate;
(aa) tri(1-hydroxy-2,2,6,6-tetramethyl-4-hydroxypiperidinium)nitrilotriacetate;
(bb) tri(1-hydroxy-2,2,6,6-tetramethyl-4-acetamidopiperidinium)nitrilotriacetate;
(cc) tri(1-hydroxy-2,2,6,6-tetramethyl-4-oxopiperidinium)nitrilotriacetate;
(dd) penta(1-hydroxy-2,2,6,6-tetramethyl-4-hydroxypiperidinium)diethylenetriaminepentamethylenephosphonate;
(ee) penta(1-hydroxy-2,2,6,6-tetramethyl-4-acetamidopiperidinium)diethylenetriaminepentamethylenephosphonate; and
(ff) penta(1-hydroxy-2,2,6,6-tetramethyl-4-oxopiperidinium)diethylenetriaminepentamethylenephosphonate.

9. An ink-jet ink or an ink-jet system according to claim 1, wherein the compound of formula (II) is of formula A*, B*, C*, D*, Q* or R*,
wherein
R is hydrogen
in formula A*,
h is 1,
$R_1$ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or
$R_1$ is alkyl of 1 to 4 carbon atoms substituted by —COOZ where Z is hydrogen or alkyl of 1 to 4 carbon atoms,
in formula B*,
m is 1 or 2,
$R_2$ is alkyl of 1 to 4 carbon atoms or $R_2$ is $CH_2(OCH_2CH_2)_nOCH_3$ where n is 1 to 4,
when m is 2,
$R_2$ is alkylene of 1 to 8 carbon atoms,
in formula C*,
$R_{10}$ is hydrogen or alkanoyl of 1 or 2 carbon atoms,
x is 1 or 2,
when x is 1,
$R_{11}$ is hydrogen, alkyl of 1 to 4 carbon atoms or glycidyl, $R_{11}$ is alkyl of 1 to 4 carbon atoms substituted by COOZ where Z is hydrogen or alkyl of 1 to 4 carbon atoms,
when x is 2,
$R_{11}$ is alkylene of 1 to 6 carbon atoms,
in formula D*,
$R_{10}$ is hydrogen,
y is 1 or 2,
$R_{12}$ is defined as $R_2$ above.

10. An ink-jet ink or an ink-jet system according to claim 1, wherein the compound of formula (II) is selected from the group consisting of
(a) 1-hydroxy-2,2-6-6-tetramethyl-4-acetoxypiperidinium citrate;
(b) 1-hydroxy-2,2,6,6-tetramethyl-4-acetamidopiperidinium bisulfate;
(c) 1-hydroxy -2,2,6,6-tetramethyl-4-oxo-piperidinium acetate;
(d) 1-hydroxy-2,2,6,6-tetramethyl-4-methoxy-piperidinium acetate;
(e) 1-hydroxy-2,2,6,6-tetramethyl-4-propoxy-piperidinium acetate;
(f) 1-hydroxy-2,2,6,6-tetramethyl-4-(2-hydroxy-4-oxapentoxy)piperidinium acetate;
(g) 1-hydroxy-2,2,6,6-tetramethyl-4-hydroxypiperidinium chloride;
(h) 1-hydroxy-2,2,6,6-tetramethyl-4-hydroxypiperidinium acetate;
(i) 1-hydroxy-2,2,6,6-tetramethyl-4-hydroxypiperidinium bisulfate;
(j) 1-hydroxy-2,2,6,6-tetramethyl-4-hydroxypiperidinium citrate;
(k) bis(1-hydroxy-2,2,6,6-tetramethyl-4-hydroxypiperidinium)citrate;
(l) tris(1-hydroxy-2,2,6,6-tetramethyl-4-hydroxypiperidinium)citrate;
(m) tetra(1-hydroxy-2,2,6,6-tetramethyl-4-hydroxypiperidinium)ethylenediaminetetraacetate;
(n) tetra(1-hydroxy-2,2,6,6-tetramethyl-4-acetamidopiperidinium)ethylenediaminetetraacetate;
(o) tetra(1-hydroxy-2,2,6,6-tetramethyl-4-oxopiperidinium)ethylenediaminetetraacetate;
(p) penta(1-hydroxy-2,2,6,6-tetramethyl-4-hydroxypiperidinium)diethylenetriaminepentaacetate;
(q) penta(1-hydroxy-2,2,6,6-tetramethyl-4-acetamidopiperidinium)diethylenetriaminepentaacetate;
(r) penta(1-hydroxy-2,2,6,6-tetramethyl-4-oxopiperidinium)diethylenetriaminepentaacetate;
(s) tri(1-hydroxy-2,2,6,6-tetramethyl-4-hydroxypiperidinium)nitrilotriacetate;
(t) tri(1-hydroxy-2,2,6,6-tetramethyl-4-acetamidopiperidinium)nitrilotriacetate;
(u) tri(1-hydroxy-2,2,6,6-tetramethyl-4-oxopiperidinium) nitrilotriacetate;
(v) penta(1-hydroxy-2,2,6,6-tetramethyl-4-hydroxypiperidinium)diethylenetriaminepentamethylenephosphonate;
(w) penta(1-hydroxy-2,2,6,6-tetramethyl-4-acetamidopiperidinium)diethylenetriaminepentamethylenephosphonate; and
(x) penta(1-hydroxy-2,2,6,6-tetramethyl-4-oxopiperidinium)diethylenetriaminepentamethylenephosphonate.

11. An ink-jet ink according to claim 1, containing 0.01 to 30% by weight of at least one compound of formula (II).

12. An ink-jet system according to claim 1, wherein the ink-jet recording material , contains 1 to 10000 mg/m² of at least one compound of the formula (II).

13. A process for stabilising ink-jet prints, which comprises applying to a recording material for ink-jet printing an ink composition containing a water soluble dye or a solution of a dye in an organic solvent and at least one compound of the formula (II) as defined in claim 1 and drying said recording material.

14. A process for stabilising ink-jet prints, which comprises applying to a recording material for ink-jet printing a casting or coating dispersion or an aqueous or organic solution containing at least one compound of the formula (II) as defined in claim 1 and further applying either an ink composition containing a water soluble dye or a solution of a dye in an organic solvent; or an ink composition containing a water soluble dye or a solution of a dye in an organic solvent and at least one compound of the formula (II) and drying said recording material.

15. An ink-jet system according to claim 1, wherein the coloured ink contains 0.01 to 30% by weight of at least one compound of formula (II).

* * * * *